(12) United States Patent
Sun et al.

(10) Patent No.: US 12,457,652 B2
(45) Date of Patent: Oct. 28, 2025

(54) STAND-ALONE SIDELINK COMMUNICATION OVER UNLICENSED BAND

(71) Applicant: QUALCOMM Incorporated, San Diego, CA (US)

(72) Inventors: Jing Sun, San Diego, CA (US); Xiaoxia Zhang, San Diego, CA (US); Changlong Xu, Beijing (CN); Chih-Hao Liu, San Diego, CA (US); Ozcan Ozturk, San Diego, CA (US); Yisheng Xue, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 469 days.

(21) Appl. No.: 17/905,916

(22) PCT Filed: Apr. 15, 2020

(86) PCT No.: PCT/CN2020/084855
§ 371 (c)(1),
(2) Date: Sep. 8, 2022

(87) PCT Pub. No.: WO2021/207961
PCT Pub. Date: Oct. 21, 2021

(65) Prior Publication Data
US 2023/0127485 A1    Apr. 27, 2023

(51) Int. Cl.
*H04W 76/14*    (2018.01)
*H04W 56/00*    (2009.01)

(52) U.S. Cl.
CPC ......... *H04W 76/14* (2018.02); *H04W 56/001* (2013.01)

(58) Field of Classification Search
CPC ... H04W 76/14; H04W 56/001; H04W 48/12; H04W 92/18; H04W 56/0015;
(Continued)

(56) References Cited

U.S. PATENT DOCUMENTS

2016/0330757 A1* 11/2016 Cherian ................ H04W 72/21
2018/0124748 A1* 5/2018 Baldemair ............ H04L 5/0092
(Continued)

FOREIGN PATENT DOCUMENTS

CN    109983725 A    7/2019
CN    110582113 A    12/2019
(Continued)

OTHER PUBLICATIONS

Huawei, et al., "Discussion on Efficient Discovery", 3GPP TSG RAN WG1 Meeting #88bis, R1-1704307, 3rd Generation Partnership Project, Mobile Competence Centre, 650, Route Des Lucioles, F-06921 Sophia-Antipolis Cedex, France, vol. RAN WG1, No. Spokane, USA, Apr. 3, 2017-Apr. 7, 2017, Apr. 2, 2017, 3 Pages, XP051242459, section 2, figures 1-2.
(Continued)

*Primary Examiner* — Kiet Tang
(74) *Attorney, Agent, or Firm* — Harrity & Harrity, LLP

(57) ABSTRACT

Wireless communications systems and methods related to stand-alone sidelink communication are provided. A first user equipment (UE) determines system parameter information to initiate a sidelink communication. The first UE transmits, in one or more first subbands of a plurality of subbands within a shared radio frequency during a first time period, the system parameter information. The first UE communicates, with a second UE in a second subband of the plurality of subbands during a second time period different from the first time period, sidelink data based on the system parameter information.

31 Claims, 10 Drawing Sheets

(58) Field of Classification Search
CPC ... H04W 16/14; H04W 52/242; H04W 72/21; H04L 5/0091; H04L 5/0053; H04L 5/0048; H04L 5/0092
See application file for complete search history.

(56) References Cited

U.S. PATENT DOCUMENTS

| | | | |
|---|---|---|---|
| 2020/0022089 A1* | 1/2020 | Guo | H04W 52/242 |
| 2021/0234663 A1* | 7/2021 | Kim | H04L 5/06 |

FOREIGN PATENT DOCUMENTS

| | | |
|---|---|---|
| CN | 110870374 A | 3/2020 |
| EP | 3454474 A1 | 3/2019 |
| EP | 3592062 A1 | 1/2020 |
| WO | 2018175553 A1 | 9/2018 |
| WO | 2020030688 A1 | 2/2020 |
| WO | 2020033086 A1 | 2/2020 |
| WO | 2020033088 A1 | 2/2020 |
| WO | 2020033795 A1 | 2/2020 |

OTHER PUBLICATIONS

Supplementary European Search Report—EP20930784—Search Authority—The Hague—Jan. 8, 2024.
Huawei, et al., "Remaining Details of Sidelink Synchronization Mechanisms," 3GPP TSG RAN WG1 Meeting #100-e, R1-2000185, Feb. 24-Mar. 6, 2020 (Mar. 6, 2020), 14 pages, the Whole Document, Sections 1-2.
International Search Report and Written Opinion—PCT/CN2020/084855 —ISA/EPO—Jan. 14, 2021.
Huawei, et al., "Discussion on Efficient Discovery", 3GPP TSG RAN WG1 Meeting #88bis, R1-1704307, 3rd Generation Partnership Project, Mobile Competence Centre, 650, Route Des Lucioles, F-06921 Sophia-Antipolis Cedex, France, vol. RAN WG1, No. Spokane, USA, Apr. 3, 2017-Apr. 7, 2017, Apr. 2, 2017, 3 Pages, XP051242459.
Huawei, et al., "Sidelink Synchronization Mechanisms for NR V2x", 3GPP TSG RAN WG1 Meeting #99, R1-1911885, Reno, USA, Nov. 18-22, 2019, Nov. 9, 2019, 24 Pages, Section 5.

\* cited by examiner

STAND-ALONE SIDELINK COMMUNICATION OVER UNLICENSED BAND

CROSS-REFERENCE TO RELATED APPLICATIONS

The present application is a 35 U.S.C. 371 National Phase entry of Patent Cooperation Treaty (PCT) Application No. PCT/CN2020/084855, filed Apr. 15, 2020, which is hereby expressly incorporated herein by reference in its entirety.

TECHNICAL FIELD

This application relates to wireless communication systems, and more particularly to stand-alone sidelink communication in a shared radio frequency band (e.g., in a shared spectrum or an unlicensed spectrum) shared by multiple network operating entities.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

In a wireless communication network, a BS may communicate with a UE in an uplink direction and a downlink direction. Sidelink was introduced in LTE to allow a UE to send data to another UE without tunneling through the BS and/or an associated core network. The LTE sidelink technology had been extended to provision for device-to-device (D2D) communications, vehicle-to-everything (V2X) communications, and/or cellular vehicle-to-everything (C-V2X) communications. Similarly, NR may be extended to support sidelink communications for D2D, V2X, and/or C-V2X over a dedicated spectrum, a licensed spectrum, and/or an unlicensed spectrum.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication includes determining, by a first UE, system parameter information to initiate a sidelink communication; transmitting, by the first UE in one or more first subbands of a plurality of subbands within a shared radio frequency during a first time period, the system parameter information; and communicating, by the first UE with a second UE in a second subband of the plurality of subbands during a second time period different from the first time period, sidelink data based on the system parameter information.

In an additional aspect of the disclosure, a first UE includes a processor configured to determine system parameter information to initiate a sidelink communication; and a transceiver configured to transmit, in one or more first subbands of a plurality of subbands within a shared radio frequency during a first time period, the system parameter information; and communicate, with a second UE in a second subband of the plurality of subbands during a second time period different from the first time period, sidelink data based on the system parameter information.

In an additional aspect of the disclosure, a non-transitory computer-readable medium having program code recorded thereon, in which the program code includes code for causing a first UE to determine system parameter information to initiate a sidelink communication; code for causing the first UE to transmit, in one or more first subbands of a plurality of subbands within a shared radio frequency during a first time period, the system parameter information; and code for causing the first UE to communicate, with a second UE in a second subband of the plurality of subbands during a second time period different from the first time period, sidelink data based on the system parameter information.

In an additional aspect of the disclosure, a first UE includes means for determining system parameter information to initiate a sidelink communication; means for transmitting, in one or more first subbands of a plurality of subbands within a shared radio frequency during a first time period, the system parameter information; and means for communicating, with a second UE in a second subband of the plurality of subbands during a second time period different from the first time period, sidelink data based on the system parameter information.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that

DETAILED DESCRIPTION

Figure 1:
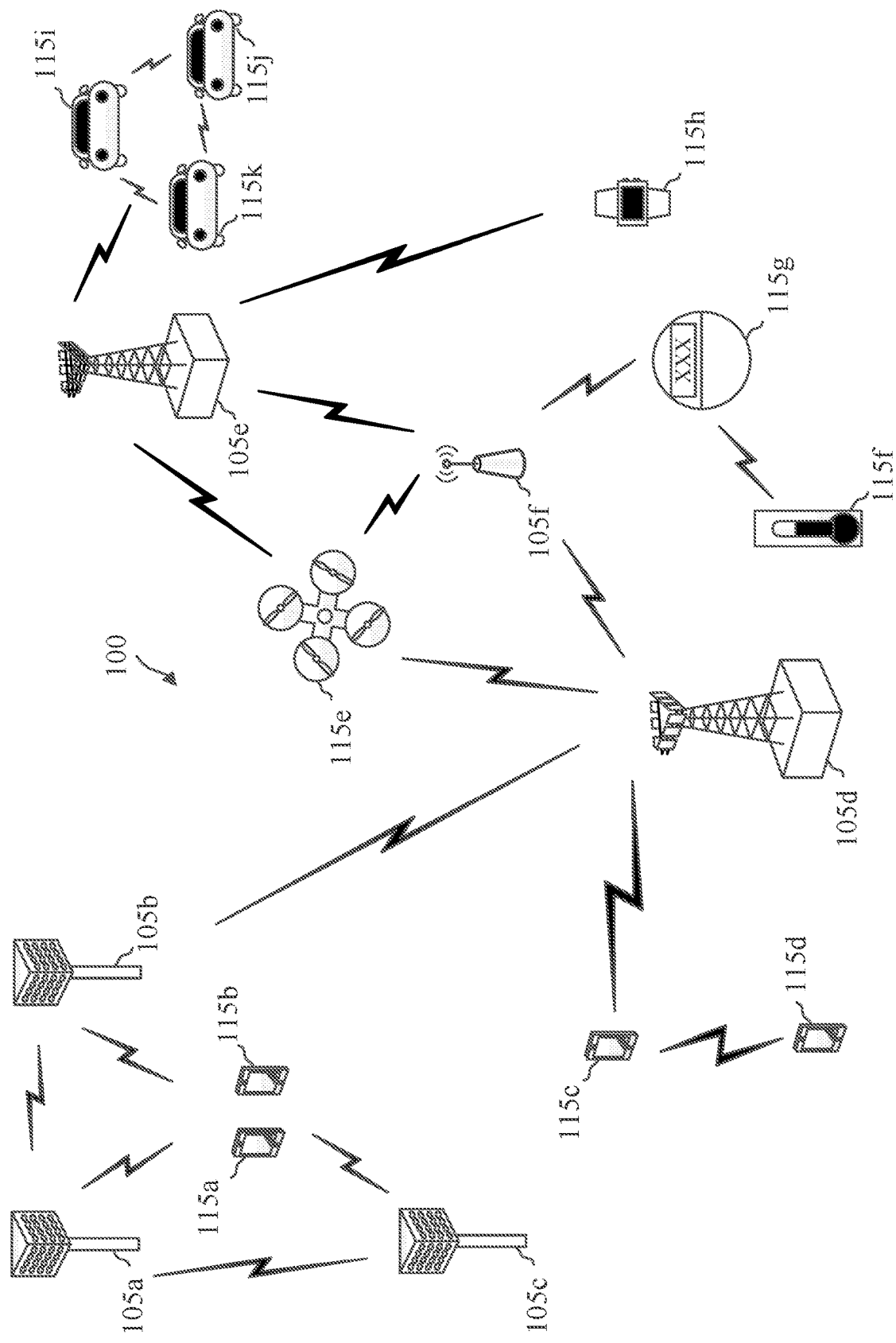
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, 5$^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~0.99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

Sidelink communications refers to the communications among user equipment devices (UEs) without tunneling through a base station (BS) and/or a core network. Sidelink communication can be communicated over a physical sidelink control channel (PSCCH) and a physical sidelink shared channel (PSSCH). The PSCCH and PSSCH are analogous to a physical downlink control channel (PDCCH) and a physical downlink shared channel (PDSCH) in downlink (DL) communication between a BS and a UE. For instance, the PSCCH may carry sidelink control information (SCI) and the PSSCH may carry sidelink data (e.g., user data). Each PSCCH is associated with a corresponding PSSCH, where SCI in a PSCCH may carry reservation and/or scheduling information for sidelink data transmission in the associated PSSCH. Use cases for sidelink communication may include V2X, enhanced mobile broadband (eMBB), industrial IoT (IIoT), and/or NR-lite.

As used herein, the term "sidelink UE" can refer to a user equipment device performing a device-to-device communication or other types of communications with another user equipment device independent of any tunneling through the BS (e.g., gNB) and/or an associated core network. As used herein, the term "sidelink transmitting UE" can refer to a user equipment device performing a sidelink transmission operation. As used herein, the term "sidelink receiving UE" can refer to a user equipment device performing a sidelink reception operation. As used herein, the terms "anchor UE" or "sidelink anchor UE" refer to a sidelink UE designated as an anchor node with a stand-alone sidelink configuration that can initiate sidelink operations autonomously (e.g., independent of any cell and/or associated core network), and the terms are interchangeable without departing from the scope of the present disclosure.

The deployment of NR over an unlicensed spectrum is referred to as NR-unlicensed (NR-U). Some studies have been conducted for NR-U deployment over 5 gigahertz (GHz) unlicensed bands. Federal Communications Commission (FCC) and European Telecommunications Standards Institute (ETSI) are working on regulating 6 GHz as a new unlicensed band for wireless communications. The addition of 6 GHz bands allows for hundreds of megahertz (MHz) of bandwidth (BW) available for unlicensed band communications. Additionally, NR-U can also be deployed over 2.4 GHz unlicensed bands, which are currently shared by various radio access technologies (RATs), such as IEEE 802.11 wireless local area network (WLAN) or WiFi and/or license assisted access (LAA). Sidelink can benefit from utilizing the additional bandwidth available in an unlicensed spectrum. However, channel access in a certain unlicensed spectrum may be regulated by authorities. For instance, regulations in a 2.4 GHz band allows a node to transmit without performing an LBT when the node applies frequency-hopping to transmissions and satisfies a transmission sequence or on/off pattern with a maximum transmission duration of about 5 ms and a minimum silent or gap duration of about 5 ms between transmissions.

NR supports two modes of radio resource allocations (RRA), a mode-1 RRA and a mode-2 RRA, for sidelink over a licensed spectrum. The mode-1 RRA supports network controlled RRA that can be used for in-coverage sidelink communication. For instance, a serving BS (e.g., gNB) may determine a radio resource on behalf of a sidelink UE and transmit an indication of the radio resource to the sidelink UE. In some aspects, the serving BS grants a sidelink transmission with downlink control information (DCI). For this mode, however, there is significant base station involvement and is only operable when the sidelink UE is within the coverage area of the serving BS. The mode-2 RRA supports autonomous RRA that can be used for out-of-coverage sidelink UEs or partial-coverage sidelink UEs. For instance, an out-of-coverage sidelink UE or a partial-coverage UE may be preconfigured with a sidelink resource pool and may select a radio resource from the preconfigured sidelink resource pool for sidelink communication. For this mode, it may be possible for V2X systems to operate independent of the serving BS. However, the mode-2 RRA relies on the sidelink settings across different environments (e.g., vehicles). For instance, this mode would require the sidelink settings to be uniform so that each sidelink UE (e.g., vehicle) can communicate with one another. This would rely on equipment user vendors (e.g., different automotive manufacturers) to coordinate and implement common sidelink settings. This may pose a substantial burden on the equipment user vendors to develop and implement a uniform sidelink setting so that all NR-U sidelink user equipment devices can communicate via respective sidelink connections. As such, there is a desire to deploy the NR-U sidelink system as a stand-alone system.

The present application describes mechanisms for sidelink UEs to deploy stand-alone sidelink communications with other sidelink UEs by having a subset of sidelink UEs configured as anchor nodes within a network that initiate sidelink operations autonomously of any cell and/or associated core network in a synchronous sidelink system operating over a shared radio frequency band (e.g., in a shared radio spectrum or an unlicensed spectrum). In various embodiments, the stand-alone sidelink system of the subject technology is not intended to replace and/or supersede the serving BS functionality to coordinate the sidelink operations. A sidelink UE may be configured to operate analogous to a user equipment device operating in a mode-2 RRA, however, the sidelink UE of the subject technology can operate with a stand-alone sidelink design having several advantages over the mode-2 RRA mechanism as will be described herein in further detail.

In some embodiments of the subject technology, a first user equipment (UE) includes a processor configured to determine system parameter information to initiate a sidelink communication. The first UE includes a transceiver configured to transmit, in one or more first subbands of a plurality of subbands within a shared radio frequency during a first time period, the system parameter information. The transceiver can communicate, with a second UE in a second subband of the plurality of subbands during a second time period different from the first time period, sidelink data based on the system parameter information.

In some embodiments, the first UE provides timing synchronization and control signaling to other sidelink UEs including the second UE. In some aspects, the processor is further configured to generate synchronization signals to facilitate synchronization between the first UE and the second UE, and allocate the synchronization signals to a first portion of a sidelink synchronization signal block (S-SSB), in which the synchronization signals comprise a primary synchronization signal followed by a secondary synchronization signal. In some aspects, the processor is further configured to determine a sidelink master information block (SL-MIB) that includes at least a portion of the system parameter information, and allocate the SL-MIB to a second portion of the S-SSB, wherein the second portion follows the first portion. In some aspects, the one or more first subbands includes a physical sidelink broadcast channel (PSBCH) in a first portion of the first time period, and the transceiver configured to transmit the system parameter information is further configured to transmit the S-SSB over the PSBCH. In some aspects, the processor configured to determine the SL-MIB is further configured to determine an initial transmission radio resource pool configuration, wherein the initial transmission radio resource pool configuration comprises one or more of a number of subchannels, a number of modulation symbols, or a set of time domain slots within the first time period during which remaining minimum system information (RMSI) is transmitted, and to allocate the initial transmission radio resource pool configuration to one or more locations in the SL-MIB. In some aspects, the processor is further configured to provide an indication within the SL-MIB that indicates whether the RMSI is present for processing by the second UE.

In some embodiments, the first UE provides additional system parameters in the form of the RMSI. In some aspects, the RMSI comprises additional system parameter information that is different from, at least a portion of, the system parameter information in the SL-MIB. In some aspects, the transceiver is further configured to communicate, with the second UE in the second subband during the first time period, the RMSI. In some aspects, the second subband includes a plurality of physical sidelink control channels (e.g., PSCCHs) multiplexed in at least one of time or frequency in a first portion of the first time period and a plurality of physical sidelink shared channels (e.g., PSSCHs) multiplexed in at least one of time or frequency in a second portion of the first time period, the second portion being different from the first portion, the transceiver configured to communicate the RMSI is further configured to communicate the RMSI in one or more PSCCHs of the plurality of PSCCHs, and the transceiver configured to communicate the sidelink data is further configured to communicate the sidelink data in at least one PSSCH of the plurality of PSSCHs. In some aspects, the transceiver is further configured to communicate an indication of an intra-cell guard band in the RMSI for use by the second UE to recover one or more resource block sets.

In some embodiments, the first UE provides bandwidth allocation within the additional system parameters. In some aspects, the transceiver is further configured to communicate a sidelink BWP configuration in the RMSI. In some aspects, the processor configured to determine the SL-MIB is further configured to determine a plurality of predefined sets of initial sidelink bandwidth portion (BWP) configurations, and to provide an indication within one or more locations in the SL-MIB that indicates at least one of the plurality of predefined sets of initial sidelink BWP configurations. In some aspects, the at least one of the plurality of predefined sets of initial sidelink BWP configurations includes a starting resource block (RB) and a number of RBs, and the starting RB corresponds to a first location in a resource grid and the S-SSB occupies at least a second location in the resource grid, in which the first location and the second location is separated by a resource block level offset. In some apects, the sidelink BWP configuration is different than, at least one of, the at least one of the plurality of predefined sets of initial sidelink BWP configurations included in the SL-MIB.

In some embodiments, the first UE provides resource allocation information to sidelink UEs. In some aspects, the transceiver is further configured to communicate a transmit resource pool configuration in the RMSI, the transmit resource pool configuration indicating which radio resources are allocated to the first UE for the first UE to transmit a sidelink communication. In some aspects, the transceiver is further configured to communicate a receive resource pool configuration in the RMSI, the receive resource pool configuration indicating which radio resources are allocated to the first UE for the first UE to receive a sidelink communication. In some aspects, the transceiver is further configured to communicate a transmission pattern of the S-SSB in the RMSI to enable the second UE to rate match the S-SSB. In some aspects, the transceiver is further configured to a transmission pattern of the RMSI in the RMSI to enable the second UE to monitor for the RMSI.

In some embodiments, the first UE provides announcements of its anchor node configuration and monitors for other anchor nodes to maintain local consistency of system parameters. In some aspects, the transceiver is further configured to transmit an outgoing announcement message to announce that the first UE is an anchor node configured to autonomously set up sidelink operations for other UEs including the second UE. In some aspects, the processor is further configured to monitor a physical sidelink discovery channel (PSDCH) for an incoming announcement message indicating a presence of another UE configured as an anchor node. In some aspects, the transceiver configured to transmit the outgoing announcement message is further configured to transmit one or more discovery messages comprising the outgoing announcement message in the PSDCH, when the incoming announcement message indicating the presence of the another UE configured as the anchor node is not detected by the first UE. In some aspects, the processor is further configured to determine that one or more predetermined factors are satisfied to justify the first UE to be an anchor node, when the incoming announcement message indicating the presence of the another UE configured as the anchor node is detected, and adopt one or more system parameters of the another UE configured as the anchor node. In some aspects, the processor configured to adopt the one or more system parameters is further configured to receive the one or more system parameters propagated from the another UE to the first UE over the PSDCH. In some aspects, the processor is further configured to update local system parameters with the one or more system parameters adopted from the another UE to generate updated system parameter information, and the transceiver is further configured to transmit, during a third time period subsequent to the first time period, the updated system parameter information. In some aspects, the transceiver configured to transmit the updated system parameter information is further configured to transmit the updated system parameter information over the PSBCH. In some aspects, the transceiver configured to transmit the updated system parameter information is further configured to transmit the updated system parameter information in one or more of a unicast transmission or a multicast transmission to one or more other UEs with a sidelink connection with the first UE. In some aspects, the processor configured to adopt the one or more system parameters is further configured to determine whether the another UE is an in-coverage UE based on a location of the another UE relative to a coverage area of a cell, and determine that the another UE has higher priority than the first UE for determining system parameters between the first UE and the another UE, when the another UE is an in-coverage UE based on the another UE being located within the coverage area of the cell.

In some aspects, the transceiver configured to communicate the sidelink data is further configured to receive, from the second UE in the second subband during the second time period, a sidelink message in at least one of the plurality of PSCCHs or in at least one of the plurality of PSSCHs based on the receive resource pool configuration, the sidelink message causing the first UE to establish a sidelink connection with the second UE.

In some aspects, the sidelink system may be a synchronous system where sidelink receiving UEs are synchronized in time, for example, based on synchronization signaling received from a sidelink anchor UE. In some aspects, the shared radio frequency band may be partitioned into multiple subchannels or frequency subbands. In some aspects, a sidelink receiving UE may be configured with one or more radio resource pools in the shared radio frequency band. The sidelink receiving UE may utilize a wideband receiver for monitoring or sensing in the respective radio resource pool and may utilize a narrowband transmitter for frequency subband-based channel access based on the allocated radio resources from the respective radio resource pool. Additionally, the channel access may be in units of sidelink communication frames in time.

Aspects of the present disclosure can provide several benefits. For example, the stand-alone sidelink system provides flexibility by facilitating the setup of system information for sidelink operation independent of any serving BS and/or associated core network. The stand-alone sidelink system can maintain local consistency of the sidelink system across multiple and/or different anchor nodes by implementing an adoption mechanism with the system parameters across the anchor nodes. In this respect, the system parameters can be kept consistent across the different anchor nodes for a coordinated deployment of user equipment devices (e.g., IIoT). Otherwise, if there are multiple anchor nodes in a neighborhood (or a network) with different system parameters, the sidelink system operation becomes increasingly burdensome. The use of a stand-alone sidelink communication mechanism can allow the sidelink system to be compatible with regulations in 2.4 GHz unlicensed bands, and thus may allow for deployment of sidelink systems over 2.4 GHz unlicensed bands. The stand-alone sidelink communication mechanism can deploy channel busy ratio (CBR) and/or channel access occupancy ratio (CR) calculations to provide a better or more accurate view to the channel state and/or sidelink UE channel utilizations within the sidelink system, and thus the sidelink anchor UE may be able to configure the sidelink UEs, the resource pool, and/or the frequency hopping patterns more efficiently for the sidelink UEs to reduce intra-system collisions. While the present disclosure is described in the context of deploying stand-alone sidelink communication over a 2.4 GHz unlicensed band, the disclosed embodiments can be applied to any suitable shared or unlicensed band.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-step-size configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as V2V, V2X, C-V2X communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining minimum system information (e.g., RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (e.g., PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant.

In some aspects, the BS 105 may communicate with a UE 115 using HARQ techniques to improve communication reliability, for example, to provide a URLLC service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 receives the DL data packet successfully, the UE 115 may transmit a HARQ ACK to the BS 105. Conversely, if the UE 115 fails to receive the DL transmission successfully, the UE 115 may transmit a HARQ NACK to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft-combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the network 100 may operate over a shared channel, which may include shared frequency bands and/or unlicensed frequency bands. For example, the network 100 may be an NR-U network operating over an unlicensed frequency band. In such an aspect, the BSs 105 and the UEs 115 may be operated by multiple network operating entities. To avoid collisions, the BSs 105 and the UEs 115 may employ a listen-before-talk (LBT) procedure to monitor for transmission opportunities (TXOPs) in the shared channel. A TXOP may also be referred to as COT. For example, a transmitting node (e.g., a BS 105 or a UE 115) may perform an LBT prior to transmitting in the channel. When the LBT passes, the transmitting node may proceed with the transmission. When the LBT fails, the transmitting node may refrain from transmitting in the channel.

An LBT can be based on energy detection (ED) or signal detection. For an energy detection-based LBT, the LBT results in a pass when signal energy measured from the channel is below a threshold. Conversely, the LBT results in a failure when signal energy measured from the channel exceeds the threshold. For a signal detection-based LBT, the LBT results in a pass when a channel reservation signal (e.g., a predetermined preamble signal) is not detected in the channel. Additionally, an LBT may be in a variety of modes. An LBT mode may be, for example, a category 4 (CAT4) LBT, a category 2 (CAT2) LBT, or a category 1 (CAT1) LBT. A CAT1 LBT is referred to a no LBT mode, where no LBT is to be performed prior to a transmission. A CAT2 LBT refers to an LBT without a random backoff period. For instance, a transmitting node may determine a channel measurement in a time interval and determine whether the channel is available or not based on a comparison of the channel measurement against a ED threshold. A CAT4 LBT refers to an LBT with a random backoff and a variable contention window (CW). For instance, a transmitting node may draw a random number and backoff for a duration based on the drawn random number in a certain time unit.

Figure 2:
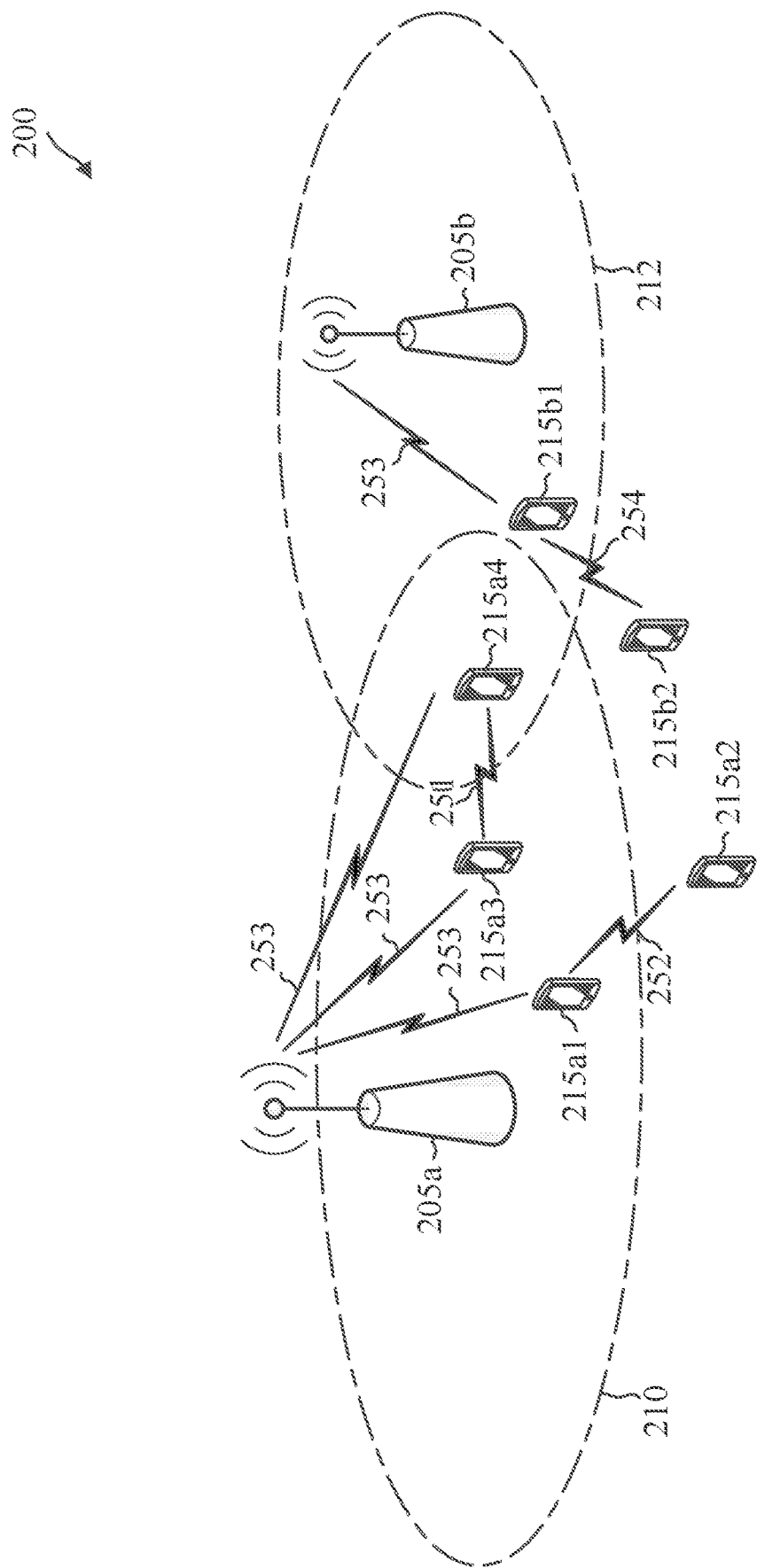
FIG. 2 illustrates a wireless communication network that provisions for sidelink communications according to some aspects of the present disclosure.

In some aspects, the network 100 may support sidelink communication among the UEs 115 over a shared radio frequency band (e.g., in a shared spectrum or an unlicensed spectrum). In some aspects, the UEs 115 may communicate with each other over a 2.4 GHz unlicensed band, which may be shared by multiple network operating entities using various radio access technologies (RATs) such as NR-U, WiFi, and/or licensed-assisted access (LAA) as shown in FIG. 2.

In some aspects, the network 100 may support stand-alone sidelink communication among the UEs 115 over a shared radio frequency band, in which a subset of the UEs 115 are adapted as anchor nodes (e.g., sidelink anchor UEs) and autonomously initiate sidelink operation for the UEs 115. In this respect, the sidelink anchor UEs are autonomous and can perform sidelink operations independent of any cell, such as BSs 105.

For brevity of explanation of the remainder of the description for FIG. 1, the UEs 115 configured as an anchor node are referred to as an "anchor UE" and the remaining UEs 115 configured to receive the system information from the anchor UE are referred to as a "sidelink receiving UE." In some examples, UE 115$j$ can represent the anchor UE and UE 115$k$ can represent the sidelink receiving UE, however, the remaining UEs 115 can individually serve as the anchor UE and the sidelink receiving UE in a respective implementation without departing from the scope of the present disclosure.

The anchor UE can autonomously determine the system parameter information (e.g., independently of any in-coverage cell and/or associated core network). Across different anchor UEs (e.g., UE 115$j$, 115$d$), the system parameter information can be substantially the same to facilitate a coordinated deployment (e.g., IIoTs) in some embodiments, or the system information can be at least partially different for deployment of different applications in other embodiments.

The anchor UE (e.g., 115$j$) can transmit synchronization signals (e.g., including PSS and SSS) in the network 100 to initiate a sidelink operation in the network 100 and facilitate synchronization with a sidelink receiving UE (e.g., 115$k$) that decides to join the sidelink operation. In some instances, each of the PSS and SSS include encoded synchronization preamble sequences.

The anchor UE can broadcast system parameter information associated with the network 100 (e.g., including a sidelink master information block (e.g., SL-MIB) and/or remaining minimum system information (e.g., RMSI) to facilitate a sidelink communication with the anchor UE. In some instances, the anchor UE may broadcast the PSS, the SSS, and/or the SL-MIB in the form of a sidelink synchronization signal block (e.g., S-SSB) over a physical sidelink broadcast channel (e.g., PSBCH). The S-SSB may be transmitted periodically at a predefined time interval. The anchor UE may transmit the RMSI over a physical sidelink shared channel (e.g., PSSCH). The PSS and the SSS may be located in a central portion of a carrier or any suitable frequencies within the carrier.

In some aspects, the UEs 115 may autonomously decide whether it should configure itself as an anchor node, and announce itself as the anchor node over a sidelink broadcast channel (e.g., PSBCH). In some aspects, the anchor UE (e.g., 115$j$) may broadcast system parameter information to neighbor UEs 115 (e.g., 115$i$, 115$k$) over the sidelink broadcast channel so that each sidelink receiving UE may monitor and recover control and data messages over a sidelink control and/or data channel, respectively. For instance, the sidelink receiving UE attempting to communicate with a neighbor sidelink UE may perform an initial anchor node search by monitoring the PSBCH and detecting a PSS from the anchor UE over the PSBCH. The PSS may enable synchronization of period timing and may indicate a physical layer identity value. The sidelink receiving UE may then receive a SSS from the anchor UE over the PSBCH. The SSS may enable radio frame synchronization, and may provide an UE identity value, which may be combined with the physical layer identity value to identify the anchor UE.

After receiving the PSS and SSS, the sidelink receiving UE may receive the SL-MIB over the PSBCH. The SL-MIB may include system information for initial network access and a pointer to scheduling information for RMSI. The SL-MIB may also include one or more predefined sets of initial BWP configurations and/or an initial transmission resource pool configuration. In some aspects, the S-SSB is transmitted within the bandwidth defined in an initial BWP configuration.

After decoding the SL-MIB, the sidelink receiving UE may recover the RMSI based on the pointer. In other instances, the anchor UE may allocate a bit location to include an indication of whether the SL-MIB includes the RMSI. For example, the SL-MIB indication may indicate there is no RMSI and the sidelink receiving UE may not attempt to recover the RMSI.

The RMSI may include additional system parameters. In some aspects, the RMSI includes intra-cell guard band information for NR-U systems for use by another sidelink receiving UE (e.g., 115$i$) to derive resource block sets. In various embodiments, the RMSI includes transmit resource pool configuration information and/or receive resource pool configuration information. The transmit resource pool configuration information may define a subset of available subframes and resource blocks for sidelink transmission by the anchor UE. The receive resource pool configuration information may define a subset of available subframes and resource blocks for sidelink reception by the anchor UE. In some aspects, the RMSI includes transmission pattern information, such as S-SSB transmission patterns for rate matching purposes and/or RMSI transmission patterns for monitoring purposes.

After obtaining the SL-MIB and/or the RMSI, the sidelink receiving UE can perform a sidelink communication procedure to establish a sidelink connection with the anchor UE. For example, the anchor UE may allocate radio resources to the sidelink receiving UE for sidelink communications via the transmission resource pool configuration included in the RMSI. The anchor UE may transmit additional system parameters, such as scheduling information, to the sidelink receiving UE over the PSCCH. The additional system parameters may be transmitted in the form of sidelink control information (SCI).

After establishing a sidelink connection, the sidelink receiving UE and the anchor UE can enter a normal sidelink operation stage, where operational sidelink data may be exchanged. The anchor UE may transmit a sidelink communication signal (e.g., carrying sidelink data) to the sidelink receiving UE over the PSSCH in accordance with the transmit resource pool configuration. The sidelink receiving UE may transmit a sidelink communication signal to the anchor UE over the PSSCH and/or the PSCCH in accordance with the receive resource pool configuration.

In some aspects, the anchor UE may communicate with the sidelink receiving UE using HARQ techniques to improve communication reliability. For example, the sidelink receiving UE may communicate a feedback message (e.g., HARQ ACK/NACK) to the anchor UE over a physical sidelink feedback channel (PSFCH).

FIG. 2 illustrates an example of a wireless communication network 200 that provisions for sidelink communications according to embodiments of the present disclosure. The network 200 may correspond to a portion of the network 100. FIG. 2 illustrates two BSs 205 (shown as 205a and 205b) and six UEs 215 (shown as 215a1, 215a2, 215a3, 215a4, 215b1, and 215b2) for purposes of simplicity of discussion, though it will be recognized that embodiments of the present disclosure may scale to any suitable number of UEs 215 (e.g., the about 2, 3, 4, 5, 7 or more) and/or BSs 205 (e.g., the about 1, 3 or more). The BS 205 and the UEs 215 may be similar to the BSs 105 and the UEs 115, respectively. The BSs 205 and the UEs 215 may share the same radio frequency band for communications. In some instances, the radio frequency band may be a 2.4 GHz unlicensed band, a 5 GHz unlicensed band, or a 6 GHz unlicensed band. In general, the shared radio frequency band may be at any suitable frequency.

The BS 205a and the UEs 215a1-215a4 may be operated by a first network operating entity. The BS 205b and the UEs 215b1-215b2 may be operated by a second network operating entity. In some aspects, the first network operating entity may utilize a same RAT as the second network operating entity. For instance, the BS 205a and the UEs 215a1-215a4 of the first network operating entity and the BS 205b and the UEs 215b1-215b2 of the second network operating entity are NR-U devices. In some other aspects, the first network operating entity may utilize a different RAT than the second network operating entity. For instance, the BS 205a and the UEs 215a1-215a4 of the first network operating entity may utilize NR-U technology while the BS 205b and the UEs 215b1-215b2 of the second network operating entity may utilize WiFi or LAA technology.

In the network 200, some of the UEs 215a1-215a4 may communicate with each other in peer-to-peer communications. For example, the UE 215a1 may communicate with the UE 215a2 over a sidelink 252, the UE 215a3 may communicate with the UE 215a4 over another sidelink 251, and the UE 215b1 may communicate with the UE 215b2 over yet another sidelink 254. The sidelinks 251, 252, and 254 are unicast bidirectional links. Some of the UEs 215 may also communicate with the BS 205a or the BS 205b in a UL direction and/or a DL direction via communication links 253. For instance, the UE 215a1, 215a3, and 215a4 are within a coverage area 210 of the BS 205a, and thus may be in communication with the BS 205a. The UE 215a2 is outside the coverage area 210, and thus may not be in direct communication with the BS 205a. In some instances, the UE 215a1 may operate as a relay for the UE 215a2 to reach the BS 205a. Similarly, the UE 215b1 is within a coverage area 212 of the BS 205b, and thus may be in communication with the BS 205b and may operate as a relay for the UE 215b2 to reach the BS 205b. In some aspects, some of the UEs 215 are associated with vehicles (e.g., similar to the UEs 115i-k) and the communications over the sidelinks 251, 252, and 254 may be C-V2X communications. C-V2X communications may refer to communications between vehicles and any other wireless communication devices in a cellular network.

As discussed above, NR supports a stand-alone sidelink communication mechanism. In some aspects, a first user equipment (UE) includes a processor configured to determine system parameter information to initiate a sidelink communication, and a transceiver configured to transmit, in one or more first subbands of a plurality of subbands within a shared radio frequency during a first time period, the system parameter information, and communicate, with a second UE in a second subband of the plurality of subbands during a second time period different from the first time period, sidelink data based on the system parameter information.

In NR and NR-U systems, synchronization subframes may be triggered by discovery and communication modes, hence there may not be a "stand-alone" broadcast/synchronization procedure. However, the subject technology provides for a sidelink anchor UE to communicate synchronization subframes to other sidelink receiving UEs by initiating a stand-alone broadcast/synchronization procedure. For example, UE 215a2 may serve as the sidelink anchor UE and UE 215a1 may serve as a sidelink receiving UE, where UE 215a2 transmits system parameter information including timing synchronization signals over a sidelink broadcast channel (e.g., PSBCH) such that the UE 215a1 can receive and recover resource allocation and timing information to facilitate a sidelink communication with the UE 215a2. For purposes of explanation and brevity of discussion, the remaining description for FIG. 2 will be discussed in reference to UE 215a1 (e.g., sidelink receiving UE) and UE 215a2 (e.g., sidelink anchor UE).

Sidelink discovery of other sidelink transmitting UEs, such as other anchor nodes, can be facilitated through the use of a transport channel referred to as a transport sidelink discovery channel (SL-DCH), and its physical counterpart, the physical sidelink discovery channel (e.g., PSDCH). In some aspects, a sidelink transmitting UE can transmit one or more announcement messages that are generated using physical layer transport blocks with zero media access control overhead. For example, the UE 215a2 can broadcast an announcement message over the PSDCH to announce its status as an anchor node.

In various embodiments, the sidelink anchor UE may utilize the sidelink discovery procedure to: 1) announce its presence as the anchor UE to potentially proximal sidelink UEs by transmitting a message containing its application information or other useful information fields (e.g., GPS coordinates, time, and the like), and 2) monitor the presence of other proximal sidelink UEs by detecting and decoding the corresponding discovery messages, and respond to the sidelink transmitting UEs using similar discovery messages. In some instances, the discovery message may include information about the type of discovery being performed and/or the type of content (e.g., announcement, query) provided by the sidelink transmitting UE. For example, the UE 215a2 may broadcast a discovery message over the PSDCH, in which the discovery message includes an indication that the discovery message pertains to an announcement of its anchor node status.

In some aspects, UE 215a2 may perform a sensing operation on one or more of a discovery channel, such as the PSDCH, or a sidelink broadcast channel, such as the PSBCH, depending on implementation. If the UE 215a2 does not detect an existing anchor UE on the discovery channel, then the UE 215a2 may configure itself as an anchor UE and broadcast an announcement indicating itself to be the anchor UE. If the UE 215a2 detects an existing anchor UE, the UE 215a2 may determine whether there is a need for it to become an anchor node within the wireless communication network 200.

In some instances, there may be multiple anchor nodes in the wireless communication network 200. A sidelink anchor UE, such as UE 215a2, may perform sensing operations on the sidelink discovery channel. In some aspects, when two anchor UEs sense each other, one anchor UE can adopt the system parameters of the other anchor UE to maintain local consistency of system parameters in the wireless communication network 200. In some instances, an in-coverage anchor UE (e.g., a sidelink anchor UE within the coverage area of an existing cell) may have priority in determining the system parameters. For example, the UE 215a1 may be configured as an anchor node such that the UE 215a2 sensed the UE 215a2 as an anchor node and determines that it is an in-coverage anchor UE based on its location being within a coverage area of BS 205a. In some embodiments, the anchor UE that adopted the new system parameters may broadcast its updated system parameters to other sidelink receiving UE over the sidelink broadcast channel. For example, the UE 215a2 may adopt the system parameters of the UE 215a1, and in turn, the UE 215a2 may broadcast its updated system parameters to other neighboring sidelink receiving UEs (e.g., 215a3, 215a4, 215b2). In other embodiments, the sidelink anchor UE may actively communicate with other sidelink receiving UEs via unicast or multicast transmissions to indicate the change in system parameters.

For in-coverage sidelink operation, where both transmitting and sidelink receiving UEs reside in the same coverage area of a BS, time synchronization is provided by the BS and there may be no need for the UE 215a2 to become an anchor UE to initiate sidelink operations by performing sidelink-specific synchronization. However, there may be several scenarios where there may be a need for the UE 215a2 to become an anchor UE to perform sidelink-specific operations: (i) in multi-cell in-coverage, where the sidelink receiving UE resides in a different asynchronous cell with respect to the sidelink transmitting UE; (ii) in partial-coverage, where the sidelink receiving UE is out of coverage and may need to acquire synchronization from the in-coverage sidelink transmitting UE; and/or (iii) out of coverage, where both sidelink UEs are outside the coverage of a cell and the sidelink transmitting UE decides to act as a reference synchronization source (referred to as the anchor UE).

In some aspects, the UE 215a2 may evaluate other factors, including but not limited to, a transmission priority level of the UE 215a2, an application type of the UE 215a2, number of sidelink UE participants within synchronization range of the UE 215a2, and/or a network congestion level within a sidelink coverage area of the UE 215a2.

In some aspects, if the UE 215a2 determines that one or more of the above-mentioned factors are satisfied through a quantitative and/or qualitative analysis, the UE 215a2 may determine that it can become an anchor node. In this respect, the UE 215a2 can adopt the system parameters and any associated timing parameters of the detected anchor UE (e.g., UE 215a1). In some aspects, the detected anchor UE may propagate its system parameters to the UE 215a2. This would allow multiple anchor UEs to coexist in the network 200 while the anchor UEs have corresponding system parameters to maintain local consistency of the sidelink system operation.

In various embodiments, the UE 215a2 as the anchor node may autonomously form mode-specific time and frequency radio resource pools. The UE 215a2 may allocate specific resources for control and data from these radio resource pools to other sidelink receiving UEs. In some instances, the UE 215a2 may form a radio resource pool for discovery communication (hereinafter referred to as "sidelink discovery resource pool"). In other instances, the UE 215a2 may form radio resource pools for control and data communications, such as a control channel resource pool (hereinafter referred to as "PSCCH resource pool") and a data channel resource pool (hereinafter referred to as "PSSCH resource pool"). In various embodiments, the UE 215a2 may provide a transmission resource pool configuration that includes configuration information for a discovery resource pool configuration and a control/data communication resource pool configuration.

Sidelink receiving UEs (e.g., UE 215a1) may monitor multiple resources to listen for discovery announcements communicated by anchor UEs (e.g., UE 215a2) to minimize and/or avoid sidelink UE interference. In some embodiments, the UE 215a2 may autonomously determine a sidelink discovery resource pool that contains certain subframes that carry sidelink control signals, whereas the remainder of subframes may carry the sidelink data. In this respect, sidelink receiving UEs may be assigned time and frequency resources for sending and/or monitoring discovery messages to other sidelink receiving UEs from the sidelink discovery resource pool. In selecting the resources from the pool, the UE 215a2 may attempt to avoid the assignment of common time/frequency resources to different sidelink receiving UEs. In some embodiments, the UE 215a2 may select the time and frequency resources from the resource pool using a randomization parameter to minimize (or at least reduce) the number of resource allocation conflicts.

In some embodiments, the discovery resource pool configuration may indicate which RBs are available for discovery transmissions, whether broadcast synchronization signals can be triggered in response to the discovery message, whether such broadcast synchronization signals are to be transmitted at once or periodically, and/or indication of how sidelink radio resources can be allocated to different discovery transmissions (e.g., autonomously by the sidelink anchor UE or sidelink transmitting UE). The discovery resource pool configuration may include additional parameter information that indicates which resources the sidelink receiving UE can monitor for identifying potential discovery announcement messages and other parameter information used for tuning channel estimation and channel decoding operations at the sidelink receiving UE. In operation of the discovery mode, the discovery messages may follow transmission of the broadcast synchronization signals in accordance with the time/frequency resource allocations defined in the discovery resource pool configuration.

In a stand-alone sidelink communication, the radio resource pools for PSCCH and PSSCH may be separate. In some instances, the PSSCH radio resource pool may begin at a fixed time-offset with respect to the PSCCH radio resource pool. In some embodiments, the UE 215a2 as the anchor node may autonomously select a time/frequency resource from the PSCCH radio resource pool based on a randomization parameter to allocate resources for the sidelink control channel, PSCCH. The UE 215a2 may also autonomously select a time/frequency resource from the PSSCH radio resource pool based on a UE-specific subframe bitmap to allocate resources for the sidelink shared channel, PSSCH. In various embodiments, sidelink communication between sidelink UEs can be facilitated through the use of a transport channel, transport sidelink shared channel (SL-SCH), and its physical counterpart, the PSSCH.

The timing synchronization and system information acquisition by sidelink receiving UEs (e.g., 215a1) may be facilitated by a sidelink broadcast transport channel, SL-BCH, and its physical counterpart, PSBCH. These channels may be used for broadcasting a set of preambles and system parameter information within proximity of the UE 215a2. The set of primary and secondary preambles, PSS and SSS, can be used for synchronization of the sidelink receiving UEs (e.g., 215a1). As described herein, the sidelink master information block, SL-MIB, can carry the sidelink system parameter information. Through the acquisition of the PSS/SSS preambles, a proximal sidelink receiving UE (e.g., UE 215a1) may acquire time synchronization with the sidelink anchor UE (e.g., UE 215a2) and obtain its physical identity. The SL-MIB may include system information for initial network access and scheduling information for the RMSI. The SL-MIB may also include one or more predefined sets of initial BWP configurations and/or an initial transmission resource pool configuration. In some aspects, the S-SSB is transmitted within the bandwidth defined in an initial BWP configuration.

After decoding the SL-MIB, the sidelink receiving UE (e.g., UE 215a1) may recover the RMSI based on a pointer included in a repurposed bit field of the SL-MIB. The RMSI may include additional system parameters. In some aspects, the RMSI includes intra-cell guard band information for NR-U systems for use by the sidelink receiving UE (e.g., UE 215a1) to derive resource block sets. In various embodiments, the RMSI includes transmit resource pool configuration information and/or receive resource pool configuration information. The transmit resource pool configuration information may define a subset of available subframes and resource blocks for sidelink transmission from the sidelink anchor UE (e.g., 215a2). The receive resource pool configuration information may define a subset of available subframes and resource blocks for sidelink reception by the sidelink anchor UE. In some aspects, the RMSI includes transmission pattern information, such as S-SSB transmission patterns for rate matching purposes and/or RMSI transmission patterns for monitoring purposes.

In some aspects, the RMSI may include an active sidelink BWP configuration to assign an active sidelink BWP to a sidelink receiving UE. The sidelink anchor UE may dynamically assign a sidelink receiving UE to operate over a certain sidelink BWP (e.g., a certain portion of the system BW) using the active sidelink BWP configuration included in the RMSI. The sidelink receiving UE may monitor for signaling information from the sidelink anchor UE in an active sidelink BWP. The active sidelink BWP configuration may correspond to the initial sidelink BWP configuration in some embodiments, or the active sidelink BWP configuration may be different from the initial sidelink BWP configuration in other embodiments. In some aspects, the active sidelink BWP configuration and the initial sidelink BWP configuration may include separate numerologies. In this respect, the UE 215a2 may schedule the UE 215a1 for a sidelink communication in the active sidelink BWP.

Figure 3:
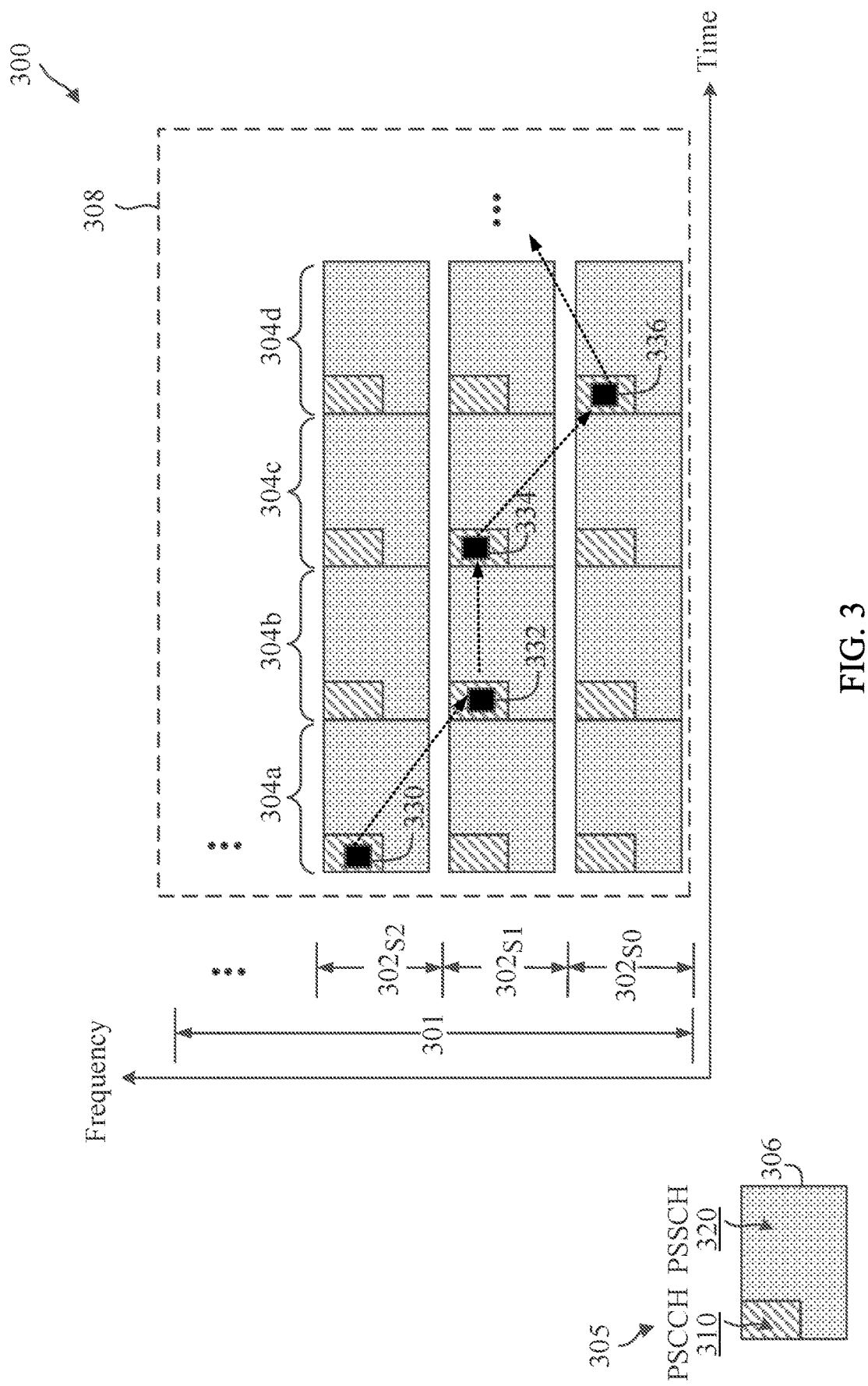
FIG. 3 illustrates a sidelink communication scheme according to some aspects of the present disclosure.

FIG. 3 illustrates a sidelink communication scheme 300 according to some aspects of the present disclosure. The scheme 300 may be employed by UEs such as the UEs 115 and/or 215 in a network such as the networks 100 and/or 200. In particular, sidelink UEs may employ the scheme 300 to communicate sidelink over a shared radio frequency band (e.g., in a shared spectrum or an unlicensed spectrum). The shared radio frequency band may be shared by multiple RATs as discussed in FIG. 2. In FIG. 3, the x-axis represents time in some arbitrary units, and the y-axis represents frequency in some arbitrary units.

In the scheme 300, a shared radio frequency band 301 is partitioned into a plurality of subchannels or frequency subbands 302 (shown as $302_{S0}$, $302_{S1}$, $302_{S2}$, . . . ) in frequency and a plurality of sidelink frames 304 (shown as 304a, 304b, 304c, 304d, . . . ) in time for sidelink communication. The frequency band 301 may be at any suitable frequencies (e.g., at about 2.4 GHz, 5 GHz, or 6 GHz). The frequency band 301 may have any suitable BW and may be partitioned into any suitable number of frequency subbands 302. The number of frequency subbands 302 can be dependent on the sidelink communication BW requirement. The frequency band 301 may be at any suitable frequencies. In some aspects, the frequency band 301 is a 2.4 GHz unlicensed band and may have a bandwidth of about 80 megahertz (MHz) partitioned into about fifteen 5 MHz frequency subbands 302.

A sidelink UE (e.g., the UEs 115 and/or 215) may be equipped with a wideband receiver and a narrowband transmitter. For instance, the UE may utilize the narrowband transmitter to access a frequency subband $302_{S2}$ for sidelink transmission utilizing a frame structure 304. The frame structure 304 is repeated in each frequency subband 302. In some instances, there can be a frequency gap or guard band between adjacent frequency subbands 302 as shown in FIG. 3, for example, to mitigate adjacent band interference. Thus, multiple sidelink data may be communicated simultaneously in different frequency subbands 302 (e.g., FDM). The frame structure 304 is also repeated in time. For instance, the frequency subband $302_{S2}$ may be time-partitioned into a plurality of frames with the frame structure 304.

The frame structure 304 includes a sidelink resource 306 in each frequency subband 302. A legend 305 indicates the types of sidelink channels within a sidelink resource 306. The sidelink resource 306 may have a substantially similar structure as an NR sidelink resource. For instance, the sidelink resource 306 may include a number of subcarriers or RBs in frequency and a number of symbols in time. In some instances, the sidelink resource 306 may have a duration between about one millisecond (ms) to about 20 ms. Each sidelink resource 306 may include a PSCCH 310 and a PSSCH 320. The PSCCH 310 and the PSSCH 320 can be multiplexed in time and/or frequency. In the illustrated example of FIG. 3, for each sidelink resource 306, the PSCCH 310 is located during the beginning symbol(s) (e.g., about 1 symbol or about 2 symbols) of the sidelink resource 306 and occupies a portion of a corresponding frequency subband 302, and the PSSCH 320 occupies the remaining time-frequency resources in the sidelink resource 306. In some instances, a sidelink resource 306 may also include a physical sidelink feedback channel (PSFCH), for example, located during the ending symbol(s) of the sidelink resource 306. In general, a PSCCH 310, a PSSCH 320, and/or a PSFCH may be multiplexed in any suitable configuration within a sidelink resource 306.

As discussed above, the subject technology provides for a sidelink UE configured as a sidelink anchor UE (e.g., 115j, 215a2) for configuring resource allocations to other sidelink receiving UEs. As such, the sidelink anchor UE can configure the sidelink receiving UE with a resource pool configuration indicating resources in the frequency band 301 and/or the subbands 302 and/or timing information associated with the sidelink frames 304. For instance, the sidelink anchor UE can provide resource allocation information to sidelink receiving UEs. In some aspects, the sidelink anchor UE can communicate a transmit resource pool configuration in the RMSI, in which the transmit resource pool configuration indicates which radio resources are allocated to the sidelink anchor UE for the sidelink anchor UE to transmit a sidelink communication. In some aspects, the sidelink anchor UE can communicate a receive resource pool configuration in the RMSI, in which the receive resource pool configuration indicates which radio resources are allocated to the sidelink anchor UE for the sidelink anchor UE to receive a sidelink communication. In this respect, sidelink receiving UEs can receive and decode the physical communication channels (e.g., PSCCH 310, PSSCH 320) from the sidelink anchor UE based on the transmit resource pool configuration, and encode and transmit the PSCCH 310 and PSSCH 320 to the sidelink anchor UE based on the receive resource pool configuration.

In sidelink communication, in order for the sidelink receiving UEs to successfully decode the PSCCH 310 and PSSCH 320, information describing the specific resources assigned by the sidelink anchor UE for transmission and the transmission configuration can be carried in the sidelink control information, SCI. In this respect, control information for sidelink communication may be communicated in the form of SCI messages. The SCI message may be transmitted over the PSCCH 310, which carries the information related to the transmission of data over the PSSCH 320.

The SCI may inform the sidelink receiving UEs about a resource reservation interval, a frequency location of initial transmission and retransmission, a time gap between initial transmission and retransmission, and modulation and coding scheme (MCS) used to modulate the data transmitted over the PSSCH 320.

The SCI messages may be populated based on the modes of radio resource allocations (e.g., mode-1 RRA or mode-2 RRA). For mode-1 RRA, the SCI may be populated using higher layer information carried by L3 control signaling (e.g., RRC, and L1 control signaling configured at a cell, such as BS 215a). For mode-2 RRA, the SCI may be populated based on autonomous decisions taken by each sidelink anchor UE. The structure of the SCI message may include a frequency hopping flag field, a resource block assignment and hopping resource allocation field, a time resource pattern field, MCS field, a time advance field and a group destination identifier field. The structure of the SCI message may include other additional fields that are suitable to support V2X control signaling. The frequency hopping flag field and the resource block assignment and hopping resource allocation field may provide information for the sidelink receiving UEs to identify the RBs where the data channel (e.g., PSSCH 320) resides. The sidelink anchor UE may autonomously configure each of these two fields. The identified RBs may belong to a sidelink communication resource pool (e.g., PSSCH resource pool). The time resource pattern field may provide the time-domain resource allocation for the data channel (e.g., PSSCH 320), and in particular the potential subframes used for PSSCH transmission. The MCS field may provide the MCS used for the PSSCH 320, which may be autonomously selected by the sidelink anchor UE. The timing advance field may provide a sidelink time adjustment for mode-2 RRA or other applicable mode. The group destination identifier field may indicate a group of sidelink receiving UEs that are potentially interested in the transmitted message from the sidelink anchor UE. This may be used by the sidelink receiving UE to ignore messages destined to other groups of sidelink UEs.

In some aspects, the SCI messages may be processed with transport channel encoding to generate SCI message transport blocks, which are then followed with physical channel encoding to generate corresponding PSCCH blocks. The PSCCH blocks are carried on respective subframe resource units for transmission. The sidelink receiving UE may receive one or more resource units over respective subframes to recover the control signaling information, and can extract the data channel allocation and transmission configuration.

The PSCCH 310 can be used for carrying SCI 330. The PSSCH 320 can be used for carrying sidelink data. The sidelink data can be of various forms and types depending on the sidelink application. For instance, when the sidelink application is a V2X application, the sidelink data may carry V2X data (e.g., vehicle location information, traveling speed and/or direction, vehicle sensing measurements, etc.). Alternatively, when the sidelink application is an IIoT application, the sidelink data may carry IIoT data (e.g., sensor measurements, device measurements, temperature readings, etc.). The PSFCH can be used for carrying feedback information, for example, HARQ ACK/NACK for sidelink data received in an earlier sidelink resource 306.

In some aspects, the scheme 300 is used for synchronous sidelink communication. In other words, the sidelink UEs are synchronized in time and are aligned in terms of symbol boundary, sidelink resource boundary (e.g., the starting time of sidelink frames 304). The sidelink UEs may perform synchronization in a variety of forms, for example, based on sidelink SSBs received from a sidelink UE and/or NR-U SSBs received from a BS (e.g., the BSs 105 and/or 205) while in-coverage of the BS. In some aspects, the sidelink UE may be preconfigured with the resource pool 308 in the frequency band 301, for example, while in a coverage of a serving BS according to a mode-1 RRA configuration. The resource pool 308 may include a plurality of sidelink resources 306.

In an NR sidelink frame structure, the sidelink frames 304 in a resource pool 308 may be contiguous in time. A sidelink receiving UE (e.g., the UEs 115 and/or 215) may include, in SCI 330, a reservation for a sidelink resource 306 in a later sidelink frame 304. Thus, another sidelink UE (e.g., a UE in the same NR-U sidelink system) may perform SCI sensing in the resource pool 308 to determine whether a sidelink resource 306 is available or occupied. For instance, if the sidelink UE detected SCI indicating a reservation for a sidelink resource 306, the sidelink UE may refrain from transmitting in the reserved sidelink resource 306. If the sidelink UE determines that there is no reservation detected for a sidelink resource 306, the sidelink UE may transmit in the sidelink resource 306. As such, SCI sensing can assist a UE in identifying a target frequency subband 302 to reserve for sidelink communication and to avoid intra-system collision with another sidelink UE in the NR sidelink system. In some aspects, the UE may be configured with a sensing window for SCI sensing or monitoring to reduce intra-system collision.

In some aspects, the sidelink UE may be configured with a frequency hopping pattern. In this regard, the sidelink UE may hop from one frequency subband 302 in one sidelink frame 304 to another frequency subband 302 in another sidelink frame 304. In the illustrated example of FIG. 3, during the sidelink frame 304a, the sidelink UE transmits SCI 330 in the sidelink resource 306 located in the frequency subband $302_{S2}$ to reserve a sidelink resource 306 in a next sidelink frame 304b located at the frequency subband $302_{S1}$. Similarly, during the sidelink frame 304b, the sidelink UE transmits SCI 332 in the sidelink resource 306 located in the frequency subband $302_{S1}$ to reserve a sidelink resource 306 in a next sidelink frame 304c located at the frequency subband $302_{S1}$. During the sidelink frame 304c, the sidelink UE transmits SCI 334 in the sidelink resource 306 located in the frequency subband $302_{S1}$ to reserve a sidelink resource 306 in a next sidelink frame 304d located at the frequency subband $302_{S0}$. During the sidelink frame 304d, the sidelink UE transmits SCI 336 in the sidelink resource 306 located in the frequency subband $302_{S0}$. The SCI 336 may reserve a sidelink resource 306 in a later sidelink frame 304.

The SCI can also indicate scheduling information and/or a destination identifier (ID) identifying a target sidelink receiving UE for the next sidelink resource 306. Thus, a sidelink UE may monitor SCI transmitted by other sidelink UEs. Upon detecting SCI in a sidelink resource 306, the sidelink UE may determine whether the sidelink UE is the target receiver based on the destination ID. If the sidelink UE is the target receiver, the sidelink UE may proceed to receive and decode the sidelink data indicated by the SCI. In some aspects, multiple sidelink UEs may simultaneously communicate sidelink data in a sidelink frame 304 in different frequency subband (e.g., via FDM). For instance, in the sidelink frame 304b, one pair of sidelink UEs may communicate sidelink data using a sidelink resource 306 in the frequency subband $302_{S2}$ while another pair of sidelink UEs may communicates sidelink data using a sidelink resource 306 in the frequency subband $302_{S1}$.

Figure 4:
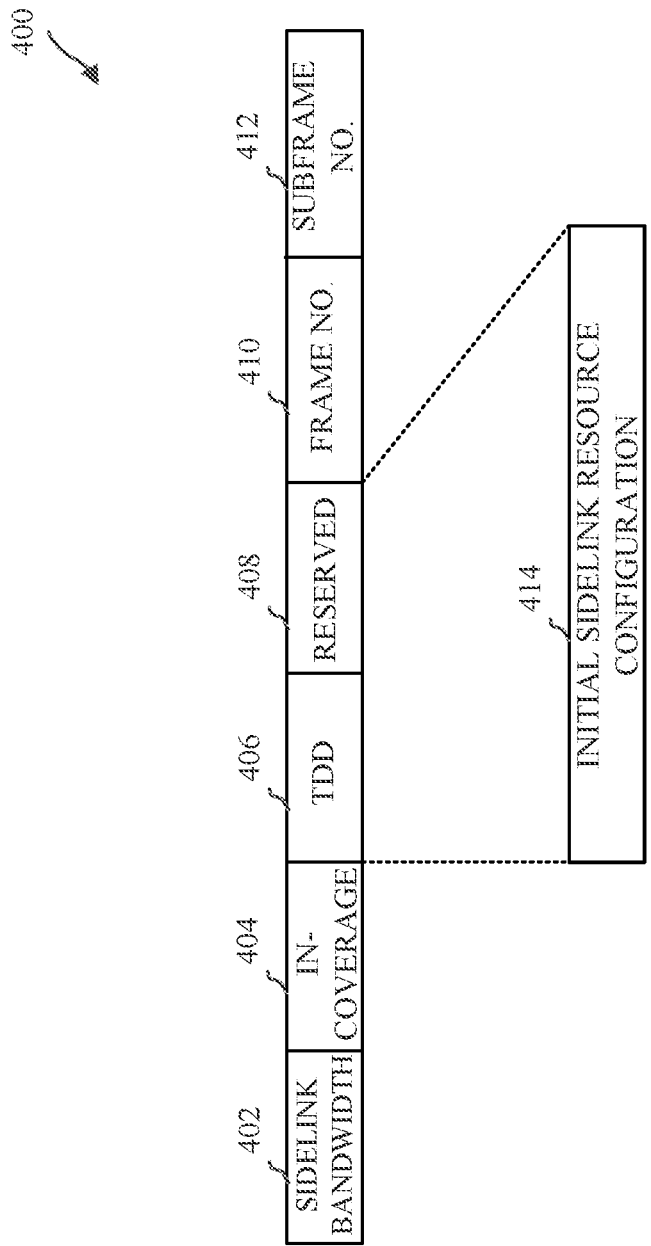
FIG. 4 is a simplified block diagram of an exemplary frame structure of a sidelink master information block according to some aspects of the present disclosure.

FIG. 4 is a simplified block diagram of an exemplary frame structure 400 of a sidelink master information block according to some aspects of the present disclosure. The frame structure 400 includes a sidelink bandwidth field 402, in-coverage indicator field 404, time-division duplex (TDD) configuration field 406, reserved field 408, frame number field 410, and subframe number field 412. Not all of the depicted frame structure fields may be required, however, and one or more implementations may include additional frame structure fields not shown in the figure. Variations in the arrangement and type of the frame structure fields may be made without departing from the scope of the claims as set forth herein. Additional frame structure fields, different frame structure fields, or fewer frame structure fields may be provided.

As described herein, the sidelink master information block can carry the system parameter information. The sidelink master information block may be analogous to MIB in NR and NR-U systems. In NR or NR-U systems, the MIB may contain an 8-bit information field that configures CORESET 0 and Type-0 PDCCH monitoring. However, in sidelink communication, the sidelink master information block may not contain such bit field information that corresponds to the CORESET 0 and Type-0 PDCCH monitoring. In some embodiments, the SL-MIB in the S-SSB may repurpose the 8-bit information field to indicate the location of the RMSI. For example, multiple bits in the reserved field 408 and/or the TDD configuration field 406 of the sidelink master information block can be repurposed by the sidelink anchor UE into an initial sidelink resource configuration field 414.

The sidelink master information block may be mapped to a reference subframe at a specific frequency and/or time resource allocation. As depicted in FIG. 4, the frame structure 400 of the sidelink master information block may include a 40-bit sequence. In some instances, the sidelink bandwidth field 402 may provide the bandwidth mode (e.g., 5, 10, 15, 20 MHz). The in-coverage indictor field 404 may inform a sidelink receiving UE about the coverage status of the sidelink anchor UE (e.g., in-coverage, partial coverage, out-of-coverage). The frame field 410 and subframe field 412 may provide timing reference information in the frame and subframe time-scales, respectively.

As depicted in FIG. 4, the TDD configuration field 406 and the reserved field 408 have been repurposed into the initial sidelink configuration field 414. In some instances, the initial sidelink configuration field 414 may include a pointer that indicates a location to the RMSI for use by the sidelink receiving UE to recover the RMSI after locating the S-SSB. In some aspects, the sidelink anchor UE may allocate a bit field in the initial sidelink resource configuration field 414 to indicate at least one of a plurality of predefined sets of initial sidelink BWP configurations. In some aspects, the sidelink master information block includes an initial transmission radio resource pool configuration at one or more bit locations within the initial sidelink configuration field 414. The initial transmission radio resource pool configuration may include one or more of a number of subchannels, a number of modulation symbols, or a set of time domain slots during which the RMSI is transmitted.

After decoding the sidelink master information block, the sidelink receiving UE may receive and recover the RMSI based on the pointer provided within the initial sidelink configuration field 414. In other instances, the anchor UE may allocate a bit location in the initial sidelink configuration field 414 to include an indication of whether the sidelink master information block includes the RMSI. For example, the sidelink master information block indication may indicate that there is no RMSI and the sidelink receiving UE may not attempt to monitor for the RMSI.

Figure 5:
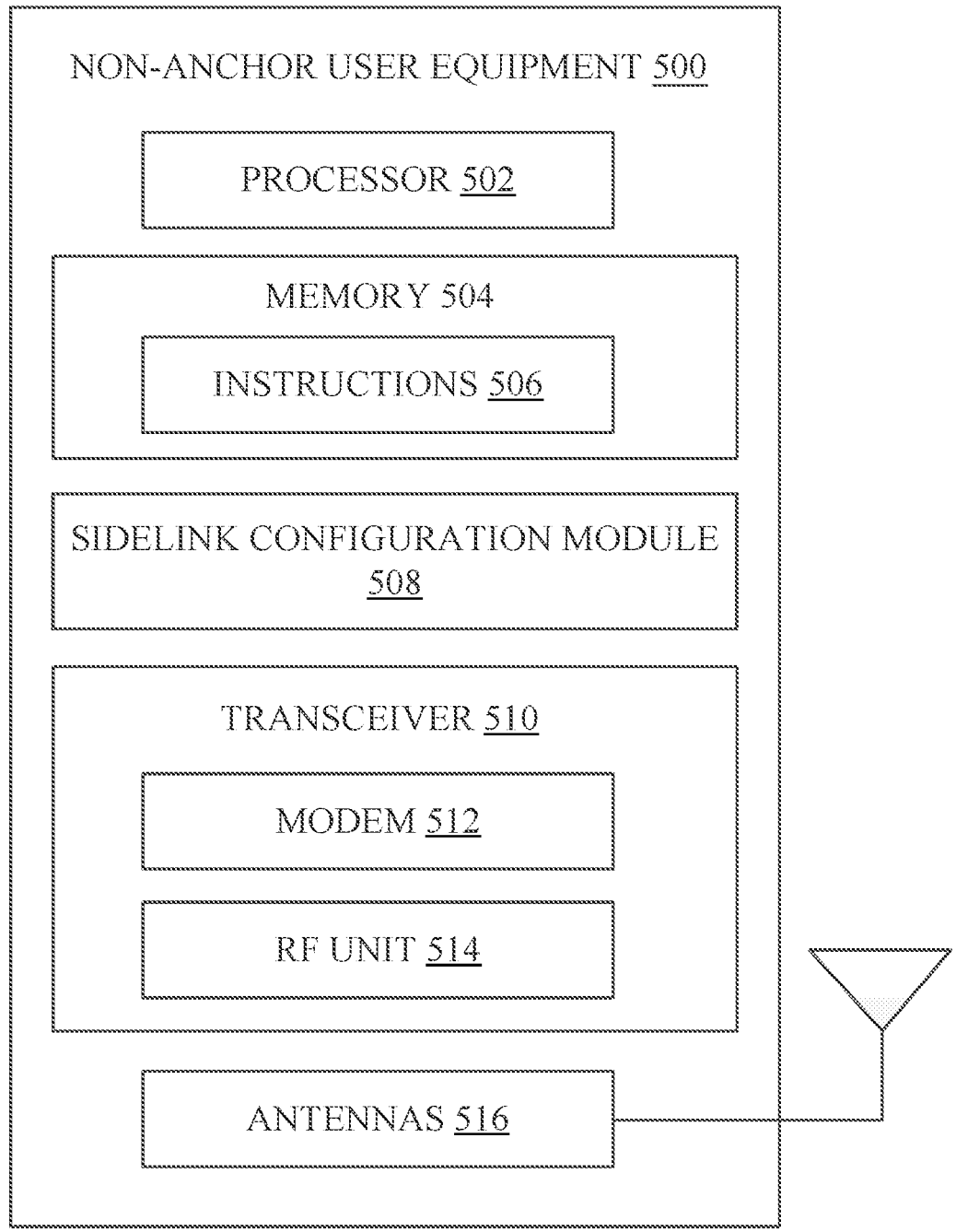
FIG. 5 is a block diagram of an exemplary non-anchor user equipment (UE) according to some aspects of the present disclosure.

FIG. 5 is a block diagram of an exemplary non-anchor UE 500 according to some aspects of the present disclosure. The non-anchor UE 500 may be a UE 115 in the network 100 as discussed above in FIG. 1 or a UE 215 discussed above in FIG. 2. As shown, the non-anchor UE 500 may include a processor 502, a memory 504, a sidelink communication module 508, a transceiver 510 including a modem subsystem 512 and a radio frequency (RF) unit 514, and one or more antennas 516. These elements may be in direct or indirect communication with each other, for example via one or more buses.

The processor 502 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 504 includes a non-transitory computer-readable medium. The memory 504 may store, or have recorded thereon, instructions 506. The instructions 506 may include instructions that, when executed by the processor 502, cause the processor 502 to perform the operations described herein with reference to the UEs 115 in connection with aspects of the present disclosure, for example, aspects of FIGS. 1-4, 8 and 10. Instructions 506 may also be referred to as program code. The program code may be for causing a wireless communication device to perform these operations, for example by causing one or more processors (such as processor 502) to control or command the wireless communication device to do so. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The sidelink communication module 508 may be implemented via hardware, software, or combinations thereof. For example, the sidelink communication module 508 may be implemented as a processor, circuit, and/or instructions 506 stored in the memory 504 and executed by the processor 502. In some instances, the sidelink communication module 508 can be integrated within the modem subsystem 512. For example, the sidelink communication module 508 can be implemented by a combination of software components (e.g., executed by a DSP or a general processor) and hardware components (e.g., logic gates and circuitry) within the modem subsystem 512.

The sidelink communication module 508 may be used for various aspects of the present disclosure, for example, aspects of FIGS. 1-4, 8 and 10. In some aspects, the sidelink communication module 508 is adapted to receive SSBs from a BS (e.g., the BSs 105 and/or 205), receive SSBs from a sidelink anchor UE (e.g., the UEs 115, 215 and/or 600), perform synchronization based on received SSBs, receive a sidelink configuration from a BS indicating a resource pool (e.g., the resource pool 308), a frequency hopping pattern, sidelink communication frame structure (e.g., the frame structure 304), and/or perform sidelink communication according to the received sidelink configuration.

As shown, the transceiver 510 may include the modem subsystem 512 and the RF unit 514. The transceiver 510 can be configured to communicate bi-directionally with other devices, such as the BSs 105. The modem subsystem 512 may be configured to modulate and/or encode the data from the memory 504 and/or the sidelink communication module 508 according to a modulation and coding scheme (MCS), e.g., a low-density parity check (LDPC) coding scheme, a turbo coding scheme, a convolutional coding scheme, a polar coding scheme, a digital beamforming scheme, etc. The RF unit 514 may be configured to process (e.g., perform analog to digital conversion or digital to analog conversion, etc.) modulated/encoded data (e.g., SCI, sidelink data, synchronization signal, SSBs) from the modem subsystem 512 (on outbound transmissions) or of transmissions originating from another source such as a UE 115 or a BS 105. The RF unit 514 may be further configured to perform analog beamforming in conjunction with the digital beamforming. Although shown as integrated together in transceiver 510, the modem subsystem 512 and the RF unit 514 may be separate devices that are coupled together at the UE 115 to enable the UE 115 to communicate with other devices.

The RF unit 514 may provide the modulated and/or processed data, e.g. data packets (or, more generally, data messages that may contain one or more data packets and other information), to the antennas 516 for transmission to one or more other devices. The RF unit 514 may process the modulated and/or processed data and generate corresponding time-domain waveforms using SC-FDMA modulation prior to transmission via the antennas 516. In other instances, the RF unit 514 may utilize OFDM modulation to generate the time-domain waveforms. The antennas 516 may further receive data messages transmitted from other devices. The antennas 516 may provide the received data messages for processing and/or demodulation at the transceiver 510. The transceiver 510 may provide the demodulated and decoded data (e.g., sidelink configuration, SCI, sidelink data, SCI reservation collision information, synchronization signal, SSBs) to the sidelink communication module 508 for processing. The antennas 516 may include multiple antennas of similar or different designs in order to sustain multiple transmission links. The RF unit 514 may configure the antennas 516. In some aspects, the RF unit 514 may include various RF components, such as local oscillator (LO), analog filters, and/or mixers. The LO and the mixers can be configured based on a certain channel center frequency. The analog filters may be configured to have a certain passband depending on a channel BW. The RF components may be configured to operate at various power modes (e.g., a normal power mode, a low-power mode, power-off mode) and may be switched among the different power modes depending on transmission and/or reception requirements at the anchor UE 500.

In an aspect, the non-anchor UE 500 can include multiple transceivers 510 implementing different RATs (e.g., NR and LTE). In an aspect, the non-anchor UE 500 can include a single transceiver 510 implementing multiple RATs (e.g., NR and LTE). In an aspect, the transceiver 510 can include various components, where different combinations of components can implement different RATs.

In some aspects, the transceiver 510 can monitor a sidelink broadcast channel (e.g., PSBCH) or a sidelink discovery channel (e.g., PSDCH). For example, the non-anchor UE 500 may monitor for any anchor UEs and/or any sidelink transmitting UEs (e.g., non-anchor nodes). In some aspects, the transceiver 510 can obtain one or more sidelink synchronization signal blocks over the sidelink broadcast channel. In some instances, the sidelink communication module 508, with the processor 502, may recover the synchronization preamble sequences (e.g., PSS, SSS) from the sidelink synchronization signal block.

In some aspects, the sidelink communication module 508, with the processor 502, may recover the sidelink master information block from the sidelink synchronization signal block. In some aspects, the sidelink communication module 508, with the processor 502, may obtain the initial sidelink BWP configuration from the sidelink master information block. In some aspects, the sidelink communication module 508, with the processor 502, may obtain the initial transmit resource pool configuration from the sidelink master information block. In some instances, the processor 502 may determine whether the RMSI is present within the sidelink master information block. If the RMSI is present, the processor 502 may determine which radio resources by which the RMSI is transmitted, from the initial transmit resource pool configuration.

In some aspects, the transceiver 510 may tune to a subband containing the PSCCH based on the RMSI radio resources. In some instances, the transceiver 510 can obtain the RMSI over the PSCCH. In some aspects, the sidelink communication module 508, with the processor 502, may recover the transmit resource pool configuration and the receive resource pool configuration from the RMSI. In this respect, the transceiver 510 can tune to a subband containing the PSSCH based on the transmit resource pool configuration. In various instances, the transceiver 510 can receive the sidelink data over the PSSCH.

Figure 6:
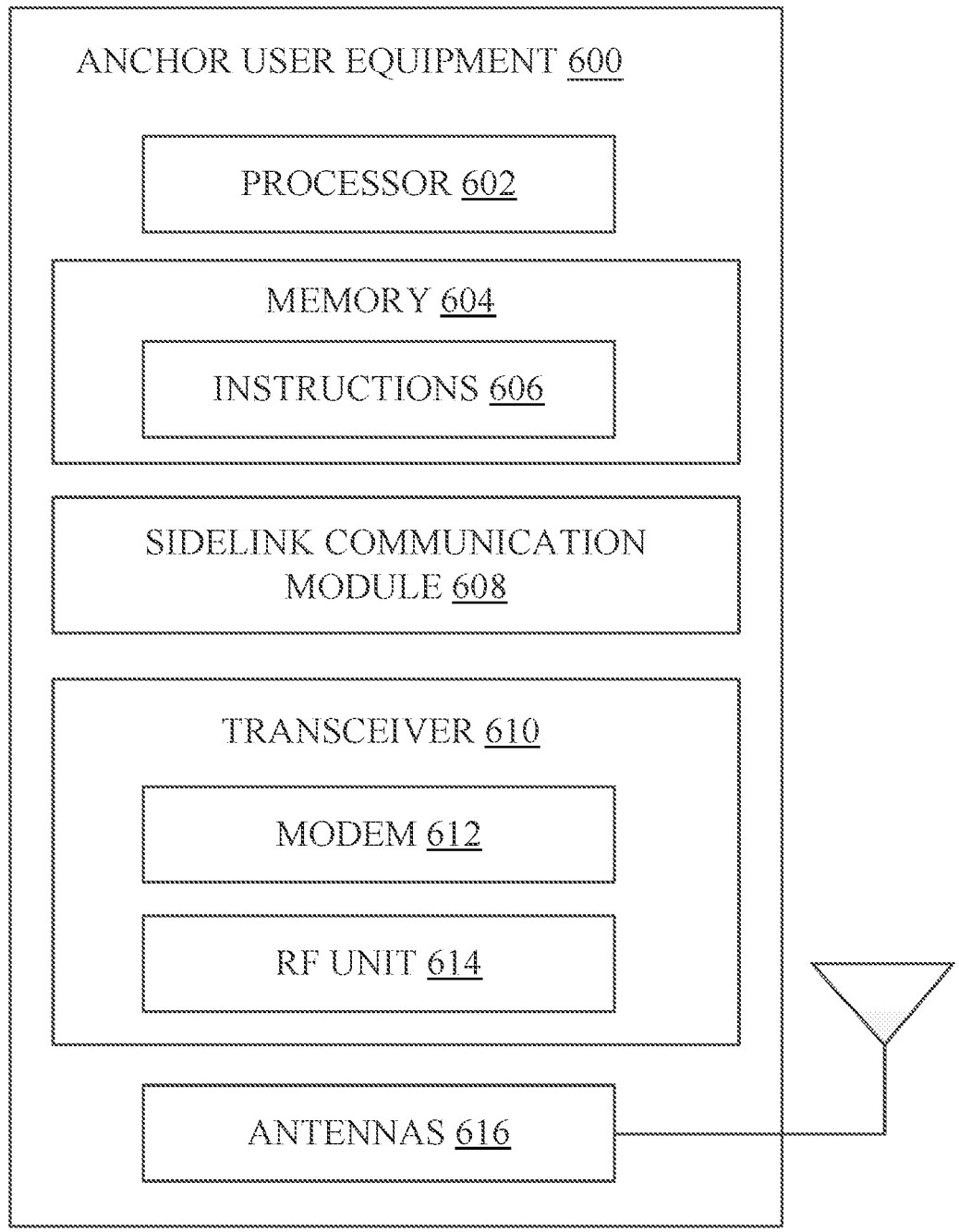
FIG. 6 is a block diagram of an exemplary anchor UE according to some aspects of the present disclosure.

FIG. 6 is a block diagram of an exemplary anchor UE 600 according to some aspects of the present disclosure. The anchor UE 600 may be a UE 115 in the network 100 as discussed above in FIG. 1 or a UE 215 discussed above in FIG. 2. As shown, the anchor UE 600 may include a processor 602, a memory 604, a sidelink configuration module 608, a transceiver 610 including a modem subsystem 612 and a RF unit 614, and one or more antennas 616. These elements may be in direct or indirect communication with each other, for example via one or more buses.

The processor 602 may have various features as a specific-type processor. For example, these may include a CPU, a DSP, an ASIC, a controller, a FPGA device, another hardware device, a firmware device, or any combination thereof configured to perform the operations described herein. The processor 602 may also be implemented as a combination of computing devices, e.g., a combination of a DSP and a microprocessor, a plurality of microprocessors, one or more microprocessors in conjunction with a DSP core, or any other such configuration.

The memory 604 may include a cache memory (e.g., a cache memory of the processor 602), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 604 may include a non-transitory computer-readable medium. The memory 604 may store instructions 606. The instructions 606 may include instructions that, when executed by the processor 602, cause the processor 602 to perform operations described herein, for example, aspects of FIGS. 1-4, 7 and 9. Instructions 606 may also be referred to as code, which may be interpreted broadly to include any type of computer-readable statement(s) as discussed above with respect to FIG. 5.

The sidelink configuration module 608 may be implemented via hardware, software, or combinations thereof. For example, the sidelink configuration module 608 may be implemented as a processor, circuit, and/or instructions 606 stored in the memory 604 and executed by the processor 602. In some instances, the sidelink configuration module 608 can be integrated within the modem subsystem 612. For example, the sidelink configuration module 608 can be implemented by a combination of software components (e.g., executed by a DSP or a general processor) and hardware components (e.g., logic gates and circuitry) within the modem subsystem 612.

The sidelink configuration module 608 may be used for various aspects of the present disclosure, for example, aspects of FIGS. 1-4, 7 and 9. For instance, the sidelink configuration module 608 is configured to transmit, to a sidelink receiving UE (e.g., the UEs 115, 215 and/or 500), a sidelink configuration indicating a sidelink resource pool, sidelink communication parameter, a sidelink resource pool, and/or a frequency hopping pattern. The sidelink configuration may indicate time-frequency resources in the sidelink resource pool. For instance, the configuration may indicate frequency band information (e.g., the frequency band 301, control channel where PSCCHs are located, a PSCCH multiplex configuration, the PSSCHs for frequency-hopping base access), PSCCH-to-PSSCH mapping, and/or sidelink frame timing information. The sidelink communication parameter may include frequency-hopping pattern. In some aspects, the sidelink configuration module 608 is configured to transmit a CBR/CR table to the UE. The CBR/CR table may include entries indicating allowable CRs for transmitter-originated SCI and allowable CRs for receiver-originated SCI at given CBRs to control intra-system collisions.

As shown, the transceiver 610 may include the modem subsystem 612 and the RF unit 614. The transceiver 610 can be configured to communicate bi-directionally with other devices, such as the UEs 115 and/or 600 and/or another core network element. The modem subsystem 612 may be configured to modulate and/or encode data according to a MCS, e.g., a LDPC coding scheme, a turbo coding scheme, a convolutional coding scheme, a polar coding scheme, a digital beamforming scheme, etc. The RF unit 614 may be configured to process (e.g., perform analog to digital conversion or digital to analog conversion, etc.) modulated/encoded data (e.g., PDCCH, PDSCH, SSBs, sidelink configuration, sidelink resource pool configuration, SSBs, frequency hopping patterns for sidelink communication) from the modem subsystem 612 (on outbound transmissions) or of transmissions originating from another source such as a UE 115 and/or UE 600. The RF unit 614 may be further configured to perform analog beamforming in conjunction with the digital beamforming. Although shown as integrated together in transceiver 610, the modem subsystem 612 and/or the RF unit 614 may be separate devices that are coupled together at the UE 115 to enable the UE 115 to communicate with other devices.

The RF unit 614 may provide the modulated and/or processed data, e.g. data packets (or, more generally, data messages that may contain one or more data packets and other information), to the antennas 616 for transmission to one or more other devices. The RF unit 614 may process the modulated and/or processed data and generate corresponding time-domain waveforms using SC-FDMA modulation prior to transmission via the antennas 616. The antennas 616 may further receive data messages transmitted from other devices and provide the received data messages for processing and/or demodulation at the transceiver 610. The transceiver 610 may provide the demodulated and decoded data to the sidelink configuration module 608 for processing. The antennas 616 may include multiple antennas of similar or different designs to sustain multiple transmission links.

In an aspect, the anchor UE 600 can include multiple transceivers 610 implementing different RATs (e.g., NR and LTE). In an aspect, the anchor UE 600 can include a single transceiver 610 implementing multiple RATs (e.g., NR and LTE). In an aspect, the transceiver 610 can include various components, where different combinations of components can implement different RATs.

Mechanisms for stand-alone sidelink communication with a sidelink transmitting UE acting as an anchor node to autonomously initiate sidelink operations with other sidelink receiving UEs over a shared radio frequency band or unlicensed band are described in greater detail herein.

In some aspects, the processor 602 can determine system parameter information to initiate a sidelink communication, and the transceiver 610 can transmit, in one or more first subbands of a plurality of subbands within a shared radio frequency during a first time period, the system parameter information, and communicate, with a second UE (e.g., the non-anchor UE 500) in a second subband of the plurality of subbands during a second time period different from the first time period, sidelink data based on the system parameter information.

In some aspects, the sidelink configuration module 608 can transmit SSBs to facilitate synchronization at UEs for synchronous sidelink communications. For instance, the sidelink communication module 508 is configured to provide timing synchronization and control signaling to other sidelink receiving UEs including the non-anchor UE 500. In some aspects, the processor 602 can generate synchronization signals to facilitate synchronization between the anchor UE 600 and the non-anchor UE 500, and allocate the synchronization signals to a first portion of a sidelink synchronization signal block (e.g., the S-SSB), in which the synchronization signals include a primary synchronization signal followed by a secondary synchronization signal. In some aspects, the processor 602 can determine a sidelink master information block (e.g., the SL-MIB) that includes at least a portion of the system parameter information, and allocate the SL-MIB to a second portion of the S-SSB, in which the second portion follows the first portion.

In some aspects, the one or more first subbands includes a physical sidelink broadcast channel (e.g., the PSBCH) in a first portion of the first time period, and the transceiver 610 can transmit the system parameter information is further configured to transmit the S-SSB over the PSBCH. In some aspects, the processor 602 can determine an initial transmission radio resource pool configuration, in which the initial transmission radio resource pool configuration may include one or more of a number of subchannels, a number of modulation symbols, or a set of time domain slots within the first time period during which remaining minimum system information (e.g., the RMSI) is transmitted, and to allocate the initial transmission radio resource pool configuration to one or more locations in the SL-MIB. In some aspects, the processor 602 can provide an indication within the SL-MIB that indicates whether the RMSI is present for processing by the non-anchor UE 500.

In some embodiments, the anchor UE 600 can provide additional system parameters in the form of the RMSI. In some aspects, the RMSI includes additional system parameter information that is different from, at least a portion of, the system parameter information in the SL-MIB. In some aspects, the transceiver 610 can communicate, with the non-anchor UE 500 in the second subband during the first time period, the RMSI. In some aspects, the second subband includes a plurality of physical sidelink control channels (e.g., the PSCCHs) multiplexed in at least one of time or frequency in a first portion of the first time period and a plurality of physical sidelink shared channels (e.g., the PSSCHs) multiplexed in at least one of time or frequency in a second portion of the first time period, in which the second portion is different from the first portion. In some aspects, the transceiver 610 can communicate the RMSI in one or more PSCCHs of the plurality of PSCCHs, and the transceiver 610 can further communicate the sidelink data in at least one PSSCH of the plurality of PSSCHs. In some aspects, the transceiver 610 can communicate an indication of an intra-cell guard band in the RMSI for use by the non-anchor UE 500 to recover one or more resource block sets.

In some embodiments, the anchor UE 600 can provide bandwidth allocation within the additional system parameters. In some aspects, the transceiver 610 can communicate a sidelink BWP configuration in the RMSI. In some aspects, the processor 602 can determine a plurality of predefined sets of initial sidelink bandwidth portion (BWP) configurations and can provide an indication within one or more locations in the SL-MIB that indicates at least one of the plurality of predefined sets of initial sidelink BWP configurations. In some aspects, the at least one of the plurality of predefined sets of initial sidelink BWP configurations may include a starting RB and a number of RBs. In this respect, the initial BWP configuration may include a group of contiguous RBs up to the number of RBs. The starting RB may correspond to a first location in a resource grid and the S-SSB may occupy at least a second location in the resource grid, in which the first location and the second location is separated by a resource block level offset. In various aspects, the resource grid includes a two-dimensional array of resource blocks and modulation symbols (e.g., OFDM symbols). In some aspects, the sidelink BWP configuration is different than, at least one of, the at least one of the plurality of predefined sets of initial sidelink BWP configurations included in the SL-MIB. In some aspects, each of the plurality of predefined sets of initial sidelink BWP configurations may include a separate numerology. In some aspects, the S-SSB is transmitted within the bandwidth defined in an initial BWP configuration.

In some embodiments, the anchor UE 600 can provide resource allocation information to sidelink receiving UEs. In some aspects, the transceiver 610 can communicate a transmit resource pool configuration in the RMSI, in which the transmit resource pool configuration may indicate which radio resources are allocated to the anchor UE 600 for the anchor UE 600 to transmit a sidelink communication. In some aspects, the transceiver 610 can communicate a receive resource pool configuration in the RMSI, in which the receive resource pool configuration may indicate which radio resources are allocated to the anchor UE 600 for the anchor UE 600 to receive a sidelink communication. In some aspects, the transceiver 610 can communicate a transmission pattern of the S-SSB in the RMSI to enable the non-anchor UE 500 to rate match the S-SSB. In some aspects, the transceiver can communicate a transmission pattern of the RMSI in the RMSI to enable the non-anchor UE 500 to monitor for the RMSI.

In some embodiments, the anchor UE 600 can provide announcements of its anchor node configuration and monitor for other anchor nodes to maintain local consistency of system parameters in the sidelink system. In some aspects, the transceiver 610 can transmit an outgoing announcement message to announce that the anchor UE 600 is an anchor node configured to autonomously set up sidelink operations for other UEs including the non-anchor UE 500. In some aspects, the processor 602 can monitor the PSDCH for an incoming announcement message indicating a presence of another UE configured as an anchor node. In some aspects, the transceiver 610 can transmit one or more discovery messages that include the outgoing announcement message in the PSDCH, when the incoming announcement message indicating the presence of the another UE configured as the anchor node is not detected by the anchor UE 600. In some aspects, the processor 602 can determine that one or more predetermined factors are satisfied to justify the first UE to be an anchor node, when the incoming announcement message indicating the presence of the another UE configured as the anchor node is detected, and can adopt one or more system parameters of the another UE configured as the anchor node. In some aspects, the processor 602 can receive the one or more system parameters propagated from the another UE to the anchor UE 600 over the PSDCH. In some aspects, the processor 602 can update local system parameters with the one or more system parameters adopted from the another UE to generate updated system parameter information, and the transceiver 610 can transmit, during a third time period subsequent to the first time period, the updated system parameter information. In some aspects, the transceiver 610 can transmit the updated system parameter information over the PSBCH. In some aspects, the transceiver 610 can transmit the updated system parameter information in one or more of a unicast transmission or a multicast transmission to one or more other UEs with a sidelink connection with the anchor UE 600. For example, the anchor 600 may perform a unicast transmission to the non-anchor UE 500 to communicate the updated system parameter information with the non-anchor UE 500. In some aspects, the processor 602 can determine whether the another UE is an in-coverage UE based on a location of the another UE relative to a coverage area of a cell (e.g., BS 205), and determine that the another UE has higher priority than the anchor UE 600 for determining system parameters between the anchor UE 600 and the another UE, when the another UE is an in-coverage UE based on the another UE being located within the coverage area of the cell.

In some aspects, the transceiver 610 can receive, from the non-anchor UE 500 in the second subband during the second time period, a sidelink message in at least one of the plurality of PSCCHs or in at least one of the plurality of PSSCHs based on the receive resource pool configuration. In some aspects, the sidelink message can cause the anchor UE 600 to establish a sidelink connection with the non-anchor UE 500.

Figure 7:
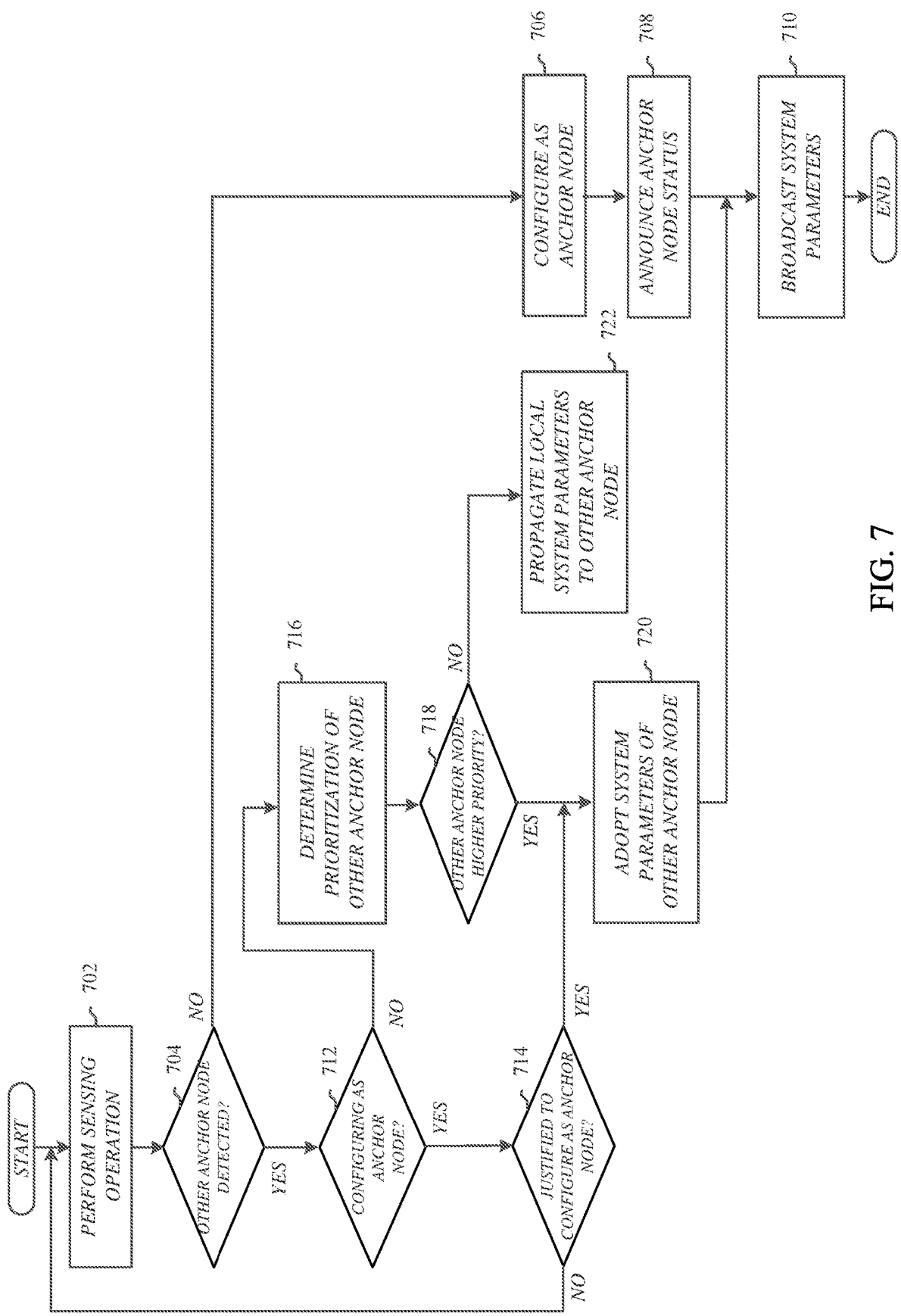
FIG. 7 is a flow diagram of an anchor node discovery process according to some aspects of the present disclosure.

FIG. 7 is a flow diagram of an anchor node discovery process according to some aspects of the present disclosure. Aspects of the process 700 can be executed by a computing device (e.g., a processor, processing circuit, and/or other suitable component) of a wireless communication device or other suitable means for performing the steps. For example, a wireless communication device, such as the UEs 115, 215, and/or 500, may utilize one or more components, such as the processor 502, the memory 504, the sidelink communication module 508, the transceiver 510, the modem 512, and the one or more antennas 516, to execute the steps of process 700. As illustrated, the process 700 includes a number of enumerated steps, but aspects of the process 700 may include additional steps before, after, and in between the enumerated steps. In some aspects, one or more of the enumerated steps may be omitted or performed in a different order.

At block 702, a sidelink transmitting UE (e.g., UE 115*j*) may perform a sensing operation. In some aspects, the sensing operation may be performed on a sidelink discovery channel. In some aspects, the sidelink discovery channel may be similar to the PSDCH. In some instances, the sidelink transmitting UE may utilize one or more components, such as the processor 502, the sidelink communication module 508, the transceiver 510, the modem 512, and the one or more antennas 516, to perform the sensing operation.

At block 704, the sidelink transmitting UE may determine whether another anchor node exists by detecting the other anchor UE over the sidelink discovery channel. In some aspects, the other anchor UE may broadcast one or more discovery messages with announcements of its presence. In some instances, the sidelink transmitting UE may utilize one or more components, such as the processor 502, the sidelink communication module 508, the transceiver 510, and the modem 512, to determine the presence of another anchor UE. If the sidelink transmitting UE detects the other anchor UE, the process 700 proceeds to block 712. Otherwise, the process 700 proceeds to block 706.

At block 706, the sidelink transmitting UE may configure itself as an anchor node, when it has determined that no other anchor node exists. In some aspects, the sidelink transmitting UE may decide autonomously to configure itself as an anchor node based on a number of factors. In some instances, the sidelink transmitting UE may utilize one or more components, such as the processor 502, to configure itself as an anchor node.

At block 708, the sidelink transmitting UE may announce its anchor node status. In some aspects, the sidelink transmitting UE may broadcast one or more discovery messages marked as announcements over the sidelink discovery channel. In some instances, the sidelink transmitting UE may utilize one or more components, such as the processor 502, the sidelink communication module 508, the transceiver 510, the modem 512, and the one or more antennas 516, to perform the announcement of its anchor node status.

At block 710, the sidelink transmitting UE (now configured as the anchor node) may broadcast system parameters. In some aspects, the sidelink transmitting UE may transmit the system parameters in the form of a sidelink synchronization signal block over a sidelink broadcast channel. In some aspects, the sidelink broadcast channel may be similar to the PSBCH. In some aspects, the sidelink synchronization signal block may contain synchronization signals (e.g., PSS, SSS) multiplexed with the sidelink master information block in time or frequency. The sidelink synchronization signal block may include a PSCCH multiplexed in time or frequency with the synchronization signals and/or the sidelink master information block, where the PSCCH may carry the remaining minimum system information. In some instances, the sidelink transmitting UE may utilize one or more components, such as the processor 502, the sidelink communication module 508, the transceiver 510, the modem 512, and the one or more antennas 516, to broadcast the system parameters.

At block 712, the sidelink transmitting UE may determine whether it is configuring itself as an anchor node. In some aspects, the sidelink transmitting UE may perform the sensing operation in a first workflow where the sidelink transmitting UE decides to become a new anchor node or in a second workflow where the sidelink transmitting UE is already configured as an anchor node and performs a routine sensing operation for other anchor nodes. If the sidelink transmitting UE is configuring itself as an anchor node, then the process 700 proceeds to block 714. Otherwise, the process 700 proceeds to block 716. In some instances, the sidelink transmitting UE may utilize one or more components, such as the processor 502, the sidelink communication module 508, the transceiver 510, and the modem 512, to determine whether it is configuring itself as an anchor node.

At block 714, the sidelink transmitting UE may determine whether configuring itself as a new anchor node is justified. In some aspects, the sidelink transmitting UE may determine its need to become an anchor node based on multiple factors. If the need is justified, the process 700 may proceed to block 720. Otherwise, the process 700 proceeds back to the start immediately preceding the block 702. In some instances, the sidelink transmitting UE may utilize one or more components, such as the processor 502, to determine whether configuring itself as a new anchor node is justified.

At block 716, the sidelink transmitting UE may determine a prioritization of the other anchor node, when the sidelink transmitting UE is not configuring itself as an anchor node since it is already an anchor node. In some aspects, the sidelink transmitting UE may consider the other anchor node's coverage with respect to a serving BS, such that an in-coverage anchor node may have higher priority. In some instances, the sidelink transmitting UE may utilize one or more components, such as the processor 502, to determine the prioritization of the other anchor node.

At block 718, the sidelink transmitting UE may determine whether the other anchor node has higher priority. In this respect, the sidelink transmitter UE may determine its coverage location relative to the coverage region of a serving BS. If the sidelink transmitting UE determines that the location of the other anchor UE is within the coverage area of the serving BS, then the sidelink transmitting UE concludes the other anchor node has higher priority. In this respect, the process 700 proceeds to block 720. Otherwise, the process 700 proceeds to block 722. In some instances, the sidelink transmitting UE may utilize one or more components, such as the processor 502, to determine whether the other anchor node has higher priority.

At block 720, the sidelink transmitting UE may adopt system parameters of the other anchor node. In some aspects, the sidelink transmitting UE adopts the system parameters of the other anchor node when the sidelink transmitting UE detected the other anchor node and it found a justifiable need to become a new anchor node. In other aspects, the sidelink transmitting UE adopts the system parameters of the other anchor node when the other anchor node has higher priority to determine the system parameters and the sidelink transmitting (configured as an anchor node in this example) is deferring to the other anchor node. In this respect, by adopting the system parameters of the other anchor node, the sidelink system of the subject technology is helping to maintain local consistency of the system parameters and helping reduce the complexity of maintaining multiple, different system parameters across anchor nodes in the sidelink system.

Returning to block 710, the sidelink transmitting UE may broadcast updated local system parameters. By adopting the system parameters of the other anchor node, the sidelink transmitting UE updates its local system parameters and announces the updated system parameters to sidelink receiving UEs. In some aspects, the sidelink transmitting UE may broadcast over the PSBCH, or may transmit the updated system parameters over a unicast transmission to a particular sidelink receiving UE or a multicast transmission to a group of sidelink receiving UEs. In some instances, the sidelink transmitting UE may utilize one or more components, such as the processor 502, the sidelink communication module 508, the transceiver 510, the modem 512, and the one or more antennas 516, to broadcast the updated local system parameters.

At block 722, the sidelink transmitting UE may propagate its system parameters to the other anchor node. In some aspects, the sidelink transmitting UE made the determination that it has the higher priority in setting up the system parameters for sidelink operation. In this regard, the other anchor node would adopt the system parameters provided by the sidelink transmitting UE. In some instances, the sidelink transmitting UE may utilize one or more components, such as the processor 502, the sidelink communication module 508, the transceiver 510, the modem 512, and the one or more antennas 516, to propagate its system parameters to the other anchor node.

Figure 8:
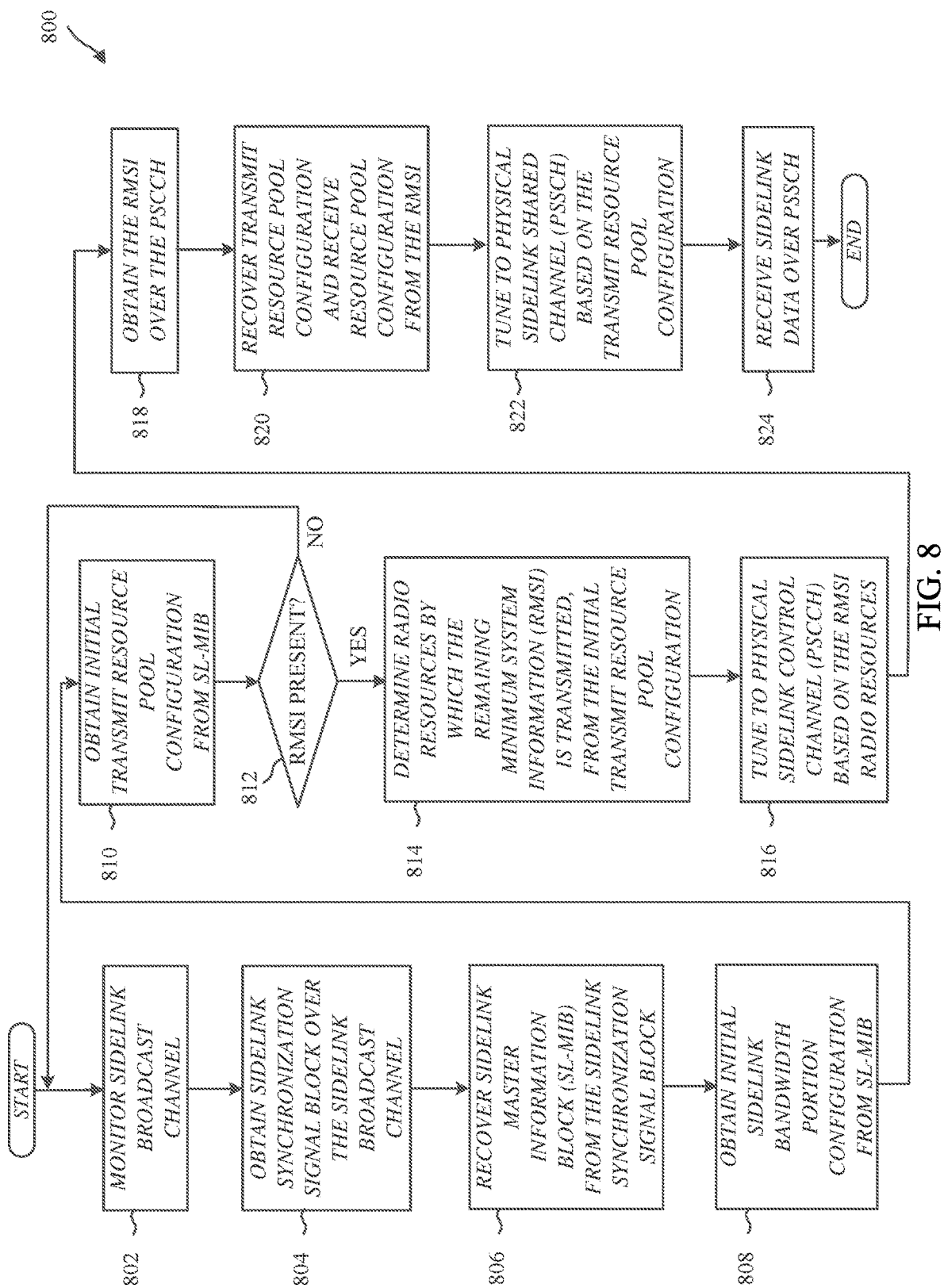
FIG. 8 is a flow diagram of a sidelink communication process according to some aspects of the present disclosure.

FIG. 8 is a flow diagram of a sidelink communication process 800 according to some aspects of the present disclosure. Aspects of the process 800 can be executed by a computing device (e.g., a processor, processing circuit, and/or other suitable component) of a wireless communication device or other suitable means for performing the steps. For example, a wireless communication device, such as the UEs 115, 215, and/or 600, may utilize one or more components, such as the processor 602, the memory 604, the sidelink communication module 608, the transceiver 610, the modem 612, and the one or more antennas 616, to execute the steps of process 800. As illustrated, the process 800 includes a number of enumerated steps, but aspects of the process 800 may include additional steps before, after, and in between the enumerated steps. In some aspects, one or more of the enumerated steps may be omitted or performed in a different order.

At block 802, a sidelink receiving UE may monitor a sidelink broadcast channel. In some aspects, the sidelink broadcast channel may be similar to the PSBCH. In some instances, the shared radio frequency band may be similar to the frequency band 301 and the subbands may be similar to the frequency subbands 302. The first time period may be similar to the sidelink frames 304. In some instances, the sidelink receiving UE may utilize one or more components, such as the processor 602, the sidelink communication module 608, the transceiver 610, the modem 612, and the one or more antennas 616, to monitor the sidelink broadcast channel.

At block 804, the sidelink receiving UE may receive, from the anchor UE in a first subband of a plurality of subbands within a shared radio frequency during a first time period, a sidelink synchronization signal block over the sidelink broadcast channel. In some instances, the sidelink receiving UE may utilize one or more components, such as the processor 602, the sidelink communication module 608, the transceiver 610, the modem 612, and the one or more antennas 616, to receive the sidelink synchronization signal block.

At block 806, the sidelink receiving UE may recover a sidelink master information block from the sidelink synchronization block. In some aspects, the sidelink master information block is multiplexed with synchronization signals (e.g., PSS, SSS) in time or frequency in the sidelink synchronization signal block. In some instances, the sidelink receiving UE may utilize one or more components, such as the processor 602, the sidelink communication module 608, the transceiver 610, and the modem 612, to recover the sidelink master information block.

At block 808, the sidelink receiving UE may obtain an initial sidelink bandwidth portion configuration from the sidelink master information block. In some aspects, the initial sidelink bandwidth portion configuration indicates a resource grid having a number of resource blocks and an indication to a starting resource block within the resource grid. In some instances, the sidelink receiving UE may utilize one or more components, such as the processor 602, the sidelink communication module 608, the transceiver 610, and the modem 612, to obtain the initial sidelink bandwidth portion configuration.

At block 810, the sidelink receiving UE may obtain an initial transmit resource pool configuration from the sidelink master information block. In some aspects, the initial transmit resource pool may indicate radio resources for sidelink messages transmitted by the anchor node, including indication of radio resources allocated to remaining minimum system information. In some instances, the sidelink receiving UE may utilize one or more components, such as the processor 602, the sidelink communication module 608, the transceiver 610, and the modem 612, to obtain the initial transmit resource pool configuration.

At block 812, the sidelink receiving UE determines whether the remaining minimum system information is present within the sidelink synchronization signal block. In some aspects, the master information block contains an indicator serving as an indication of whether the remaining minimum system information is present. In this respect, if the indication does show that the remaining minimum system information is present, the process 800 proceeds to block 814 where the sidelink receiving UE can attempt to recover the remaining minimum system information. Otherwise, the process 800 proceeds back to the start immediately preceding the block 802.

At block 814, the sidelink receiving UE may determine radio resources by which the remaining minimum system information is transmitted from the initial transmit resource pool configuration. In some aspects, the sidelink receiving UE may refer to a pointer included in the master information block, which enables the sidelink receiving UE to locate and decode the remaining minimum system information. In some aspects, the pointer may correspond to a repurposed bit field within the sidelink master information block. In some instances, the sidelink receiving UE may utilize one or more components, such as the processor 602, the sidelink communication module 608, the transceiver 610, and the modem 612, to determine the radio resources of the remaining minimum system information.

At block 816, the sidelink receiving UE may tune to a sidelink control channel based on the radio resources of the remaining minimum system information. In some aspects, the sidelink control channel may be similar to the PSCCH. In some instances, the sidelink receiving UE may utilize one or more components, such as the processor 602, the sidelink communication module 608, the transceiver 610, the modem 612, and the one or more antennas 616, to tune to the sidelink control channel.

At block 818, the sidelink receiving UE may obtain the remaining minimum system information over the PSCCH. In some instances, the sidelink receiving UE may utilize one or more components, such as the processor 602, the sidelink communication module 608, the transceiver 610, and the modem 612, to recover the remaining minimum system information.

At block 820, the sidelink receiving UE may recover a transmit resource pool configuration from the remaining minimum system information. In some aspects, the remaining minimum system information also may include a receive resource pool configuration. In some instances, the sidelink receiving UE may utilize one or more components, such as the processor 602, the sidelink communication module 608, the transceiver 610, and the modem 612, to recover the transmit resource pool configuration.

At block 822, the sidelink receiving UE may tune to a sidelink shared channel based on the radio resources of the remaining minimum system information. In some aspects, the sidelink shared channel may be similar to the PSSCH. In some instances, the sidelink receiving UE may utilize one or more components, such as the processor 602, the sidelink communication module 608, the transceiver 610, the modem 612, and the one or more antennas 616, to tune to the sidelink shared channel.

At block 824, the sidelink receiving UE may receive, from the anchor UE in a second subband of the plurality of subbands during a second time period different from the first time period, sidelink data over the PSSCH based on the transmit resource pool configuration. In some instances, the first UE may utilize one or more components, such as the processor 602, the sidelink communication module 608, the transceiver 610, the modem 612, and the one or more antennas 616, to receive the sidelink data.

Figure 9:
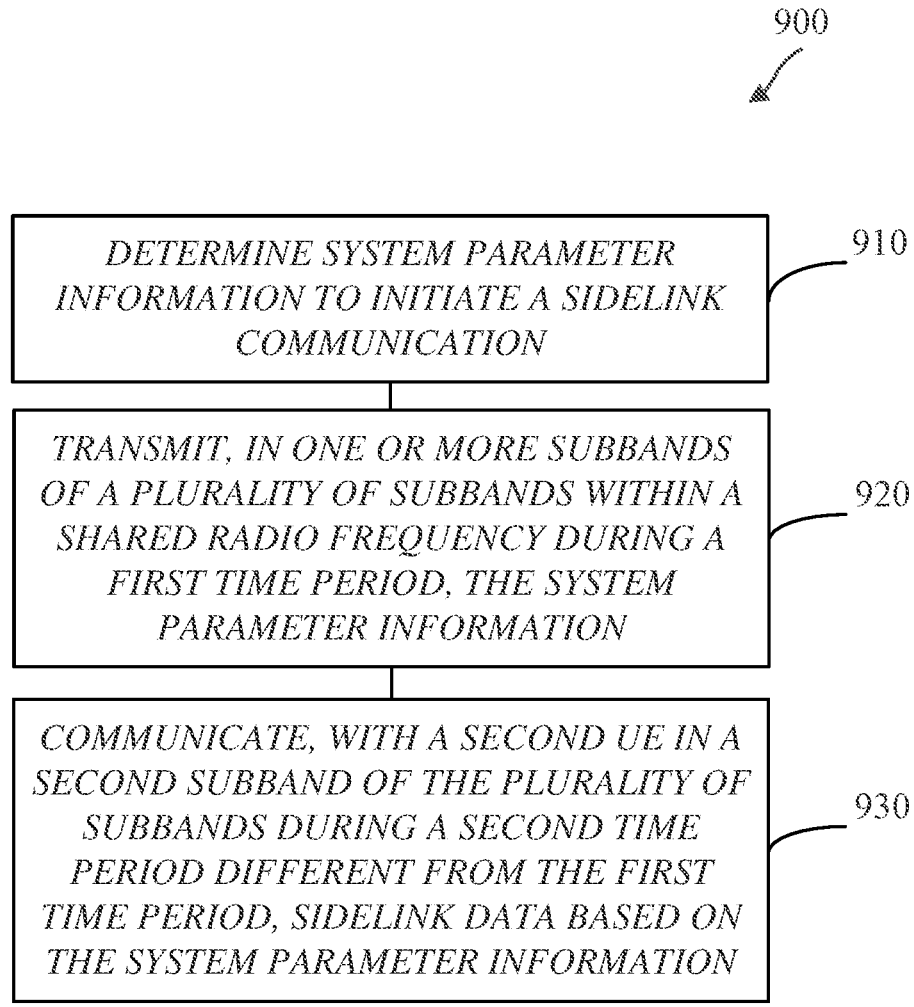
FIG. 9 is a flow diagram of a sidelink system information broadcasting process according to some aspects of the present disclosure.

FIG. 9 is a flow diagram of a sidelink system information broadcasting process 900 according to some aspects of the present disclosure. Aspects of the process 900 can be executed by a computing device (e.g., a processor, processing circuit, and/or other suitable component) of a wireless communication device or other suitable means for performing the steps. For example, a wireless communication device, such as the UEs 115, 215, and/or 500, may utilize one or more components, such as the processor 502, the memory 504, the sidelink communication module 508, the transceiver 510, the modem 512, and the one or more antennas 516, to execute the steps of process 900. The process 900 may employ, at least in part, similar mechanisms as in the process 700 discussed above with respect to FIG. 7. As illustrated, the process 900 includes a number of enumerated steps, but aspects of the process 900 may include additional steps before, after, and in between the enumerated steps. In some aspects, one or more of the enumerated steps may be omitted or performed in a different order.

At block 910, a sidelink transmitting UE (or the anchor UE) may determine system parameter information to initiate a sidelink communication. In some aspects, the anchor UE determines the system parameter information autonomously and independent of any serving BS and/or associated core network. In some instances, the sidelink receiving UE may utilize one or more components, such as the processor 502, to determine the system parameter information.

At block 920, the anchor UE may transmit, in one or more subbands of a plurality of subbands within a shared radio frequency during a first time period, system parameter information over a sidelink broadcast channel. In some instances, the shared radio frequency band may be similar to the frequency band 301 and the subbands may be similar to the frequency subbands 302. The first time period may be similar to the sidelink frames 304. In some instances, the sidelink receiving UE may utilize one or more components, such as the processor 502, the sidelink communication module 508, the transceiver 510, the modem 512, and the one or more antennas 516, to transmit the system parameter information.

At block 930, the anchor UE may communicate, with a sidelink receiving UE in a second subband of the plurality of subbands during a second time period different from the first time period, sidelink data based on the system parameter information. In some instances, the first UE may utilize one or more components, such as the processor 502, the sidelink communication module 508, the transceiver 510, the modem 512, and the one or more antennas 516, to communicate the sidelink data.

Figure 10:
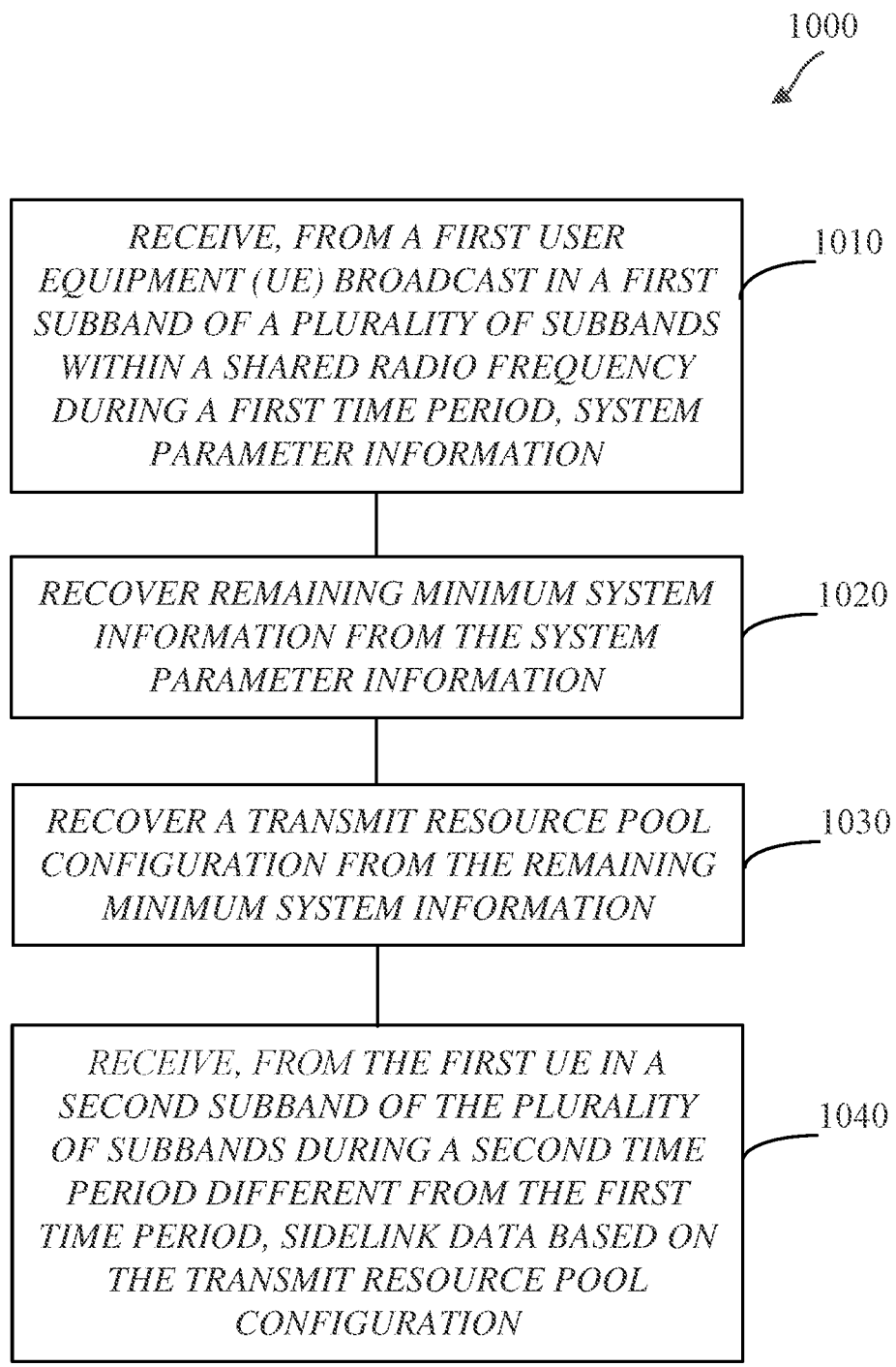
FIG. 10 is a flow diagram of a sidelink communication process according to some aspects of the present disclosure.

FIG. 10 is a flow diagram of a sidelink communication process 1000 according to some aspects of the present disclosure. Aspects of the process 1000 can be executed by a computing device (e.g., a processor, processing circuit, and/or other suitable component) of a wireless communication device or other suitable means for performing the steps. For example, a wireless communication device, such as the UEs 115, 215, and/or 600, may utilize one or more components, such as the processor 602, the memory 604, the sidelink communication module 608, the transceiver 610, the modem 612, and the one or more antennas 616, to execute the steps of process 1000. The process 1000 may employ similar mechanisms as in the process 800 discussed above with respect to FIG. 8. As illustrated, the process 1000 includes a number of enumerated steps, but aspects of the process 1000 may include additional steps before, after, and in between the enumerated steps. In some aspects, one or more of the enumerated steps may be omitted or performed in a different order.

At block 1010, a sidelink receiving UE may receive, from a sidelink transmitting UE (or the anchor UE) in a first subband of a plurality of subbands within a shared radio frequency during a first time period, system parameter information over a sidelink broadcast channel. In some instances, the shared radio frequency band may be similar to the frequency band 301 and the subbands may be similar to the frequency subbands 302. The first time period may be similar to the sidelink frames 304. In some instances, the sidelink receiving UE may utilize one or more components, such as the processor 602, the sidelink communication module 608, the transceiver 610, the modem 612, and the one or more antennas 616, to receive the system parameter information.

At block 1020, the sidelink receiving UE may recover remaining minimum system information from the system parameter information. In some aspects, the sidelink receiving UE may refer to a pointer included in a master information block as part of the system parameter information, which enables the sidelink receiving UE to locate and decode the remaining minimum system information. In some instances, the sidelink receiving UE may utilize one or more components, such as the processor 602, the sidelink communication module 608, the transceiver 610, and the modem 612, to recover the remaining minimum system information.

At block 1030, the sidelink receiving UE may recover a transmit resource pool configuration from the remaining minimum system information. In some aspects, the remaining minimum system information also may include a receive resource pool configuration. In some instances, the sidelink receiving UE may utilize one or more components, such as the processor 602, the sidelink communication module 608, the transceiver 610, and the modem 612, to recover the transmit resource pool configuration.

At block 1040, the sidelink receiving UE may receive, from the anchor UE in a second subband of the plurality of subbands during a second time period different from the first time period, sidelink data based on the transmit resource pool configuration. In some instances, the first UE may utilize one or more components, such as the processor 602, the sidelink communication module 608, the transceiver 610, the modem 612, and the one or more antennas 616, to receive the sidelink data.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, further comprising:
   determining, by a first user equipment (UE), system parameter information to initiate a sidelink communication;
   transmitting, by the first UE in one or more first subbands of a plurality of subbands within a shared radio frequency during a first time period, the system parameter information;
   communicating, by the first UE with a second UE in a second subband of the plurality of subbands during a second time period different from the first time period, sidelink data based on the system parameter information;
   generating, by the first UE, synchronization signals to facilitate synchronization between the first UE and the second UE;
   allocating, by the first UE, the synchronization signals to a first portion of a sidelink synchronization signal block (S-SSB),
   wherein the synchronization signals comprise a primary synchronization signal followed by a secondary synchronization signal;
   determining, by the first UE, a sidelink master information block (SL-MIB) that includes at least a portion of the system parameter information; and
   allocating, by the first UE, the SL-MIB to a second portion of the S-SSB,
   wherein the second portion follows the first portion.

2. The method of claim 1, wherein:
   the one or more first subbands includes a physical sidelink broadcast channel (PSBCH) in a first portion of the first time period, and
   the transmitting the system parameter information comprises transmitting, by the first UE, the S-SSB over the PSBCH.

3. The method of claim 1, wherein the determining the SL-MIB comprises:
   determining, by the first UE, an initial transmission radio resource pool configuration, wherein the initial transmission radio resource pool configuration comprises one or more of a number of subchannels, a number of modulation symbols, or a set of time domain slots within the first time period during which remaining minimum system information (RMSI) is transmitted; and allocating, by the first UE, the initial transmission radio resource pool configuration to one or more locations in the SL-MIB.

4. The method of claim 1, further comprising: communicating, by the first UE with the second UE in the second subband during the first time period, the RMSI.

5. A method of wireless communication, comprising:
determining, by a first user equipment (UE), system parameter information to initiate a sidelink communication;
transmitting, by the first UE in one or more first subbands of a plurality of subbands within a shared radio frequency during a first time period, the system parameter information;
communicating, by the first UE with a second UE in a second subband of the plurality of subbands during a second time period different from the first time period, sidelink data based on the system parameter information; and
transmitting, by the first UE, an outgoing announcement message to announce that the first UE is an anchor node configured to autonomously set up sidelink operations for other UEs including the second UE.

6. A first user equipment (UE) comprising:
a processor configured to:
determine system parameter information to initiate a sidelink communication;
generate synchronization signals to facilitate synchronization between the first UE and the second UE; and
allocate the synchronization signals to a first portion of a sidelink synchronization signal block (S-SSB), wherein the synchronization signals comprise a primary synchronization signal followed by a secondary synchronization signal;
determine a sidelink master information block (SL-MIB) that includes at least a portion of the system parameter information; and
allocate the SL-MIB to a second portion of the S-SSB, wherein the second portion follows the first portion; and
a transceiver configured to:
transmit, in one or more first subbands of a plurality of subbands within a shared radio frequency during a first time period, the system parameter information;
communicate, with a second UE in a second subband of the plurality of subbands during a second time period different from the first time period, sidelink data based on the system parameter information.

7. The first UE of claim 6, wherein:
the one or more first subbands includes a physical sidelink broadcast channel (PSBCH) in a first portion of the first time period, and
the transceiver configured to transmit the system parameter information is further configured to transmit the S-SSB over the PSBCH.

8. The first UE of claim 6, wherein the processor configured to determine the SL-MIB is further configured to:
determine an initial transmission radio resource pool configuration, wherein the initial transmission radio resource pool configuration comprises one or more of a number of subchannels, a number of modulation symbols, or a set of time domain slots within the first time period during which remaining minimum system information (RMSI) is transmitted; and allocate the initial transmission radio resource pool configuration to one or more locations in the SL-MIB.

9. The first UE of claim 8, wherein the transceiver is further configured to:
communicate, with the second UE in the second subband during the first time period, the RMSI.

10. The first UE of claim 9, wherein:
the second subband includes a plurality of physical sidelink control channels (PSCCHs) multiplexed in at least one of time or frequency in a first portion of the first time period and a plurality of physical sidelink shared channels (PSSCHs) multiplexed in at least one of time or frequency in a second portion of the first time period, the second portion being different from the first portion,
the transceiver configured to communicate the RMSI is further configured to communicate the RMSI in one or more PSCCHs of the plurality of PSCCHs, and
the transceiver configured to communicate the sidelink data is further configured to communicate the sidelink data in at least one PSSCH of the plurality of PSSCHs.

11. The first UE of claim 8, wherein the processor is further configured to:
provide an indication within the SL-MIB that indicates whether the RMSI is present for processing by the second UE.

12. The first UE of claim 8, wherein the RMSI comprises additional system parameter information that is different from, at least a portion of, the system parameter information in the SL-MIB.

13. The first UE of claim 8, wherein the processor configured to determine the SL-MIB is further configured to:
determine a plurality of predefined sets of initial sidelink bandwidth portion (BWP) configurations; and
provide an indication within one or more locations in the SL-MIB that indicates at least one of the plurality of predefined sets of initial sidelink BWP configurations.

14. The first UE of claim 13, wherein:
the at least one of the plurality of predefined sets of initial sidelink BWP configurations includes a starting resource block (RB) and a number of RBs, and
the starting RB corresponds to a first location in a resource grid and the S-SSB occupies at least a second location in the resource grid, the first location and the second location being separated by a resource block level offset.

15. The first UE of claim 13, wherein the transceiver is further configured to:
communicate a sidelink BWP configuration in the RMSI.

16. The first UE of claim 15, wherein the sidelink BWP configuration is different than, at least one of, the at least one of the plurality of predefined sets of initial sidelink BWP configurations included in the SL-MIB.

17. The first UE of claim 8, wherein the transceiver is further configured to:
communicate an indication of an intra-cell guard band in the RMSI for use by the second UE to recover one or more resource block sets.

18. The first UE of claim 8, wherein the transceiver is further configured to:
communicate a transmit resource pool configuration in the RMSI, the transmit resource pool configuration indicating which radio resources are allocated to the first UE for the first UE to transmit a sidelink communication.

19. The first UE of claim 10, wherein the transceiver is further configured to:
  communicate a receive resource pool configuration in the RMSI, the receive resource pool configuration indicating which radio resources are allocated to the first UE for the first UE to receive a sidelink communication.

20. The first UE of claim 19, wherein the transceiver configured to communicate the sidelink data is further configured to:
  receive, from the second UE in the second subband during the second time period, a sidelink message in at least one of the plurality of PSCCHs or in at least one of the plurality of PSSCHs based on the receive resource pool configuration, the sidelink message causing the first UE to establish a sidelink connection with the second UE.

21. The first UE of claim 8, wherein the transceiver is further configured to:
  communicate a transmission pattern of the S-SSB in the RMSI to enable the second UE to rate match the S-SSB.

22. The first UE of claim 8, wherein the transceiver is further configured to:
  communicate a transmission pattern of the RMSI in the RMSI to enable the second UE to monitor for the RMSI.

23. A first user equipment (UE) of comprising:
  a processor configured to:
    determine system parameter information to initiate a sidelink communication; and
  a transceiver configured to:
    transmit, in one or more first subbands of a plurality of subbands within a shared radio frequency during a first time period, the system parameter information;
    communicate, with a second UE in a second subband of the plurality of subbands during a second time period different from the first time period, sidelink data based on the system parameter information; and
    transmit an outgoing announcement message to announce that the first UE is an anchor node configured to autonomously set up sidelink operations for other UEs including the second UE.

24. The first UE of claim 23, wherein the processor is further configured to:
  monitor a physical sidelink discovery channel (PSDCH) for an incoming announcement message indicating a presence of another UE configured as an anchor node.

25. The first UE of claim 24, wherein the transceiver configured to transmit the outgoing announcement message is further configured to:
  transmit one or more discovery messages comprising the outgoing announcement message in the PSDCH, when the incoming announcement message indicating the presence of the another UE configured as the anchor node is not detected by the first UE.

26. The first UE of claim 24, wherein the processor is further configured to:
  determine that one or more predetermined factors are satisfied to justify the first UE to be an anchor node, when the incoming announcement message indicating the presence of the another UE configured as the anchor node is detected; and
  adopt one or more system parameters of the another UE configured as the anchor node.

27. The first UE of claim 26, wherein the processor configured to adopt the one or more system parameters is further configured to:
  receive the one or more system parameters propagated from the another UE to the first UE over the PSDCH.

28. The first UE of claim 26, wherein:
  the processor is further configured to:
    update local system parameters with the one or more system parameters adopted from the another UE to generate updated system parameter information; and
  the transceiver is further configured to:
    transmit, during a third time period subsequent to the first time period, the updated system parameter information.

29. The first UE of claim 28, wherein the transceiver configured to transmit the updated system parameter information is further configured to:
  transmit the updated system parameter information over a physical sidelink broadcast channel (PSBCH).

30. The first UE of claim 28, wherein the transceiver configured to transmit the updated system parameter information is further configured to:
  transmit the updated system parameter information in one or more of a unicast transmission or a multicast transmission to one or more other UEs with a sidelink connection with the first UE.

31. The first UE of claim 26, wherein the processor configured to adopt the one or more system parameters is further configured to:
  determine whether the another UE is an in-coverage UE based on a location of the another UE relative to a coverage area of a cell; and
  determine that the another UE has higher priority than the first UE for determining system parameters between the first UE and the another UE, when the another UE is an in-coverage UE based on the another UE being located within the coverage area of the cell.

* * * * *